United States Patent
Di et al.

(10) Patent No.: US 11,360,225 B1
(45) Date of Patent: Jun. 14, 2022

(54) EARTHQUAKE EVALUATION METHOD BASED ON MULTI-TYPE GEOPHYSICAL DATA

(71) Applicant: Institute of Geology and Geophysics, Chinese Academy of Sciences, Beijing (CN)

(72) Inventors: Qingyun Di, Beijing (CN); Fei Tian, Beijing (CN); Yongyou Yang, Beijing (CN); Zhongxing Wang, Beijing (CN); Wenhao Zheng, Beijing (CN); Renzhong Pei, Beijing (CN); Wenxiu Zhang, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 17/679,222

(22) Filed: Feb. 24, 2022

(30) Foreign Application Priority Data

Mar. 2, 2021  (CN) .......................... 202110228947.8

(51) Int. Cl.
*G01V 1/28* (2006.01)
*G01V 1/34* (2006.01)
*G01V 1/30* (2006.01)

(52) U.S. Cl.
CPC .............. *G01V 1/282* (2013.01); *G01V 1/302* (2013.01); *G01V 1/345* (2013.01); *G01V 2210/64* (2013.01)

(58) Field of Classification Search
CPC ........ G01V 1/282; G01V 1/302; G01V 1/345; G01V 2210/64
See application file for complete search history.

(56) References Cited

U.S. PATENT DOCUMENTS

| 3,459,928 A * | 8/1969 | Anstey ................. G06G 7/1914 |
| | | 708/841 |
| 11,022,707 B2 * | 6/2021 | Hsu ........................ G01V 1/303 |
| 2009/0064602 A1 * | 3/2009 | Lee .......................... E01D 19/06 |
| | | 14/73.1 |

FOREIGN PATENT DOCUMENTS

| CN | 102368094 A | 3/2012 |
| CN | 102612659 A | 7/2012 |
| CN | 107066481 A | 8/2017 |

* cited by examiner

Primary Examiner — Elias Desta

(57) ABSTRACT

The present disclosure provides an earthquake evaluation method based on multi-type geophysical data. The method includes: acquiring natural seismic data about intraplate earthquakes that had occurred, surface elevation data, Bouguer gravity anomaly data, aeromagnetic anomaly data, seismic wave tomography, crustal GPS movement rate and focal mechanism solution in a target region; constructing planar grids of the target region, and respectively performing plane gridding processing on the natural seismic data about the intraplate earthquakes that had occurred, the surface elevation data, the Bouguer gravity anomaly data, and the aeromagnetic anomaly data based on the constructed planar grids of the target region; determining a plane distribution map of a meizoseismal area in the target region based on the data subjected to the plane gridding processing; and superimposing a surface elevation map and the plane distribution map of the meizoseismal area in the target region with the seismic wave tomography, and analyzing the crustal movement on both sides of the meizoseismal area and the matching relationship between the meizoseismal area and the crustal geological structure in combination with the crustal GPS movement rate and the focal mechanism solution so as to determine the geologic origin of a pleistoseismic zone.

17 Claims, 13 Drawing Sheets

EARTHQUAKE EVALUATION METHOD BASED ON MULTI-TYPE GEOPHYSICAL DATA

CROSS-REFERENCE TO RELATED APPLICATIONS

The application claims priority to Chinese patent application No. 202110228947.8, filed on Mar. 2, 2022, the entire contents of which are incorporated herein by reference.

TECHNICAL FIELD

The present disclosure belongs to the technical field of intraplate natural earthquake evaluation, and in particular relates to an earthquake evaluation method based on multi-type geophysical data.

BACKGROUND

Intraplate earthquakes are earthquakes caused by the movement of continental plates, which occur inside plates. Their locations are relatively scattered, their frequencies are lower, their harm is great, and their focal mechanisms are complex. The research of continental geology and seismo-geology for nearly a hundred years shows that the interior of a seemingly stable continent is neither a complete rigid body nor a complete elastic body. The remote effect, produced by the relative movement between the plates, of a tectonic force acting on the plate boundary is transmitted to the interiors of the plates, and the structural revival, formed by the multi-stage tectonic movement, of a pre-existing structure is now a boundary between different blocks within the plates; and both of them may lead to a relative motion between different blocks within the present-day seemingly stable continent, and further induce catastrophic earthquakes. Therefore, more and more attention has been paid to the intraplate earthquakes which cause great damage.

Although the intraplate earthquakes occur infrequently, the attenuation of seismic energy with distance inside the plates is usually very low, which can lead to even moderate earthquakes being devastating. For example, earthquakes of New Madrid (1811) in the United States, Latur (1992) and Gujarat (2001) in India and other places all occurred within the plates; in particular, in 2008, the intraplate earthquake with a magnitude of 7.9 in Wenchuan, China caused approximately 70,000 deaths and a total of losses in excess of $100 billion. However, the intraplate earthquakes have the characteristics of strong randomness in occurrence time, development depth and earthquake magnitude; simple shaft plumbing display can only describe the occurrence characteristics of earthquakes qualitatively; based on the distribution of the existing intraplate seismic data, it is difficult to determine which areas are prone to intraplate earthquakes; and compared with interplate earthquakes, the intraplate earthquakes occur in regions with very low strain rates nowadays, and deep preexisting faults are difficult to identify. Therefore, the accurate analysis of the intraplate earthquakes is a great challenge.

SUMMARY

The object of the present disclosure is to provide a method capable of realizing quantitative evaluation and analysis of intraplate natural earthquakes.

In order to achieve the above object, the present disclosure provides an earthquake evaluation method based on multi-type geophysical data, where the method includes:

acquiring natural seismic data about intraplate earthquakes that had occurred, surface elevation data, Bouguer gravity anomaly data, aeromagnetic anomaly data, seismic wave tomography, crustal GPS movement rate and focal mechanism solution in a target region, wherein the seismic wave tomography comprises seismic surface wave tomography and/or seismic body wave tomography;

constructing planar grids of the target region by making the target region to be subjected to plane gridding; respectively performing plane gridding processing on the natural seismic data about the intraplate earthquakes, the surface elevation data, the Bouguer gravity anomaly data and the aeromagnetic anomaly data in accordance with the planar grids of the target region to obtain plane-gridded natural seismic data, plane-gridded surface elevation data, plane-gridded Bouguer gravity anomaly data and plane-gridded aeromagnetic anomaly data;

determining a plane distribution map of a meizoseismal area in the target region based on the plane-gridded natural seismic data, the plane-gridded surface elevation data, the plane-gridded Bouguer gravity anomaly data, and the plane-gridded aeromagnetic anomaly data (for a map capable of reflecting the distribution characteristics of a meizoseismal area in a target region on a plane, you can either choose a map which can only reflect the plane distribution characteristics of the meizoseismal area, or choose a map that can both reflect the plane distribution characteristics of the meizoseismal area and other types of seismic zones);

superimposing a surface elevation map and the plane distribution map of the meizoseismal area in the target region with the seismic wave tomography, and analyzing the crustal movement on both sides of the meizoseismal area and the matching relationship between the meizoseismal area and the crustal geological structure in combination with the crustal GPS movement rate and the focal mechanism solution so as to determine the geologic origin of a pleistoseismic zone.

The above-mentioned earthquake evaluation method based on the multi-type geophysical data evaluates the intraplate natural earthquakes based on multi-attribute geological-geophysical data.

Further, wherein the construction of the planar grids of the target region by making the target region to be subjected to plane gridding comprises: establishing the grids at 0.01°-0.1° in the east-west direction and at 0.01°-0.1° in the north-south direction.

For example, plane gridding processing includes: establishing grids at 0.05° in the east-west direction (that is, the width is 5.55×cos θ km, and θ is the latitude of the point), and at 0.05° in the north-south direction (that is, the length is 5.55 km).

In the above-mentioned earthquake evaluation method based on the multi-type geophysical data, preferably, in accordance with planar grids of a target region, plane gridding processing performed on the natural seismic data about intraplate earthquakes includes:

based on the natural seismic data about the intraplate earthquakes that had occurred in the target region, determining intraplate earthquake magnitudes of all the grids in the target region to obtain the magnitude distribution of the intraplate earthquakes that had occurred in the target region, so as to obtain plane-gridded natural seismic data in the target region, and further achieve quantitative characterization of seismic energy distribution in the target region, where in the process of determining the intraplate earthquake magnitudes of all the grids in the target region, for each grid in the target region, the intraplate natural earthquakes in the same grid are superimposed in accordance with the energy, and the intraplate earthquake magnitude of the grid is determined based on the superimposed energy.

Further, wherein in the process of performing plane gridding processing on the natural seismic data about the intraplate earthquakes, when the energy obtained by means of superimposition in one grid is zero, the superimposed energy in the grid is defined as 1.

In the above-mentioned earthquake evaluation method based on the multi-type geophysical data, preferably, in accordance with the planar grids of the target region, plane gridding processing performed on surface elevation data includes:

based on the surface elevation data in the target region, determining surface elevation values of all the grids in the target region to obtain plane-gridded surface elevation data in the target region, where in the process of determining the surface elevation values of all the grids in the target region, for each grid in the target region, the surface elevation data in the same grid is averaged to obtain an average surface elevation value of the grid as the surface elevation value of the grid.

Further, wherein in the process of performing plane gridding processing on the surface elevation data, when there is no surface elevation data in one grid, the surface elevation values of four grids which are located in the east, west, south and north of the grid and are adjacent to the grid are taken to calculate a geometric average value as the surface elevation value of the grid.

In the above-mentioned earthquake evaluation method based on the multi-type geophysical data, preferably, in accordance with the planar grids of the target region, plane gridding processing performed on Bouguer gravity anomaly data includes:

based on the surface elevation data in the target region, determining Bouguer gravity anomaly values of all the grids in the target region to obtain plane-gridded Bouguer gravity anomaly data in the target region, where in the process of determining the Bouguer gravity anomaly values of all the grids in the target region, for each grid in the target region, the Bouguer gravity anomaly data in the same grid is averaged to obtain an average Bouguer gravity anomaly value of the grid as the Bouguer gravity anomaly value of the grid.

Further, wherein in the process of performing plane gridding processing on the Bouguer gravity anomaly data, when there is no Bouguer gravity anomaly data in one grid, the Bouguer gravity anomaly values of four grids which are located in the east, west, south and north of the grid and are adjacent to the grid are taken to calculate a geometric average value as the Bouguer gravity anomaly value of the grid.

In the above-mentioned earthquake evaluation method based on the multi-type geophysical data, preferably, in accordance with the planar grids of the target region, plane gridding processing performed on aeromagnetic anomaly data includes:

based on the surface elevation data in the target region, determining aeromagnetic anomaly values of all the grids in the target region to obtain plane-gridded aeromagnetic anomaly data in the target region, where in the process of determining the aeromagnetic anomaly values of all the grids in the target region, for each grid in the target region, the aeromagnetic anomaly data in the same grid is averaged to obtain an average aeromagnetic anomaly value of the grid as the aeromagnetic anomaly value of the grid.

Further, wherein in the process of performing plane gridding processing on the aeromagnetic anomaly data, when there is no aeromagnetic anomaly data in one grid, the aeromagnetic anomaly values of four grids which are located in the east, west, south and north of the grid and are adjacent to the grid are taken to calculate a geometric average value as the aeromagnetic anomaly value of the grid.

Further, wherein the determination, based on the plane-gridded natural seismic data, the plane-gridded surface elevation data, the plane-gridded Bouguer gravity anomaly data and the plane-gridded aeromagnetic anomaly data, of the plane distribution map of the meizoseismal area in the target region comprises:

normalizing the plane-gridded natural seismic data, the plane-gridded surface elevation data, the plane-gridded Bouguer gravity anomaly data and the plane-gridded aeromagnetic anomaly data respectively to obtain normalized and plane-gridded natural seismic data, normalized and plane-gridded surface elevation data, normalized and plane-gridded Bouguer gravity anomaly data, and normalized and plane-gridded aeromagnetic anomaly data;

performing dimensionality reduction on the normalized and plane-gridded natural seismic data, the normalized and plane-gridded surface elevation data, the normalized and plane-gridded Bouguer gravity anomaly data, and the normalized and plane-gridded aeromagnetic anomaly data by using a principal component analysis method to obtain first principal component data and second principal component data;

performing cluster analysis on all groups of principal component data, determining a first principal component threshold value and a second principal component threshold value of the meizoseismal area, and dividing the target region into the meizoseismal area and a non-meizoseismal area to obtain the plane distribution map of the meizoseismal area in the target region; wherein the process of performing the cluster analysis on all the groups of principal component data further comprises: determining first principal component threshold values and second principal component threshold values of a moderate earthquake area and a weak earthquake area, and further dividing the non-meizoseismal area in the target region into the moderate earthquake area, the weak earthquake area and an aseismic area so as to obtain a plane distribution map of different types of seismic zones in the target region;

the first principal component data=0.91×the normalized and plane-gridded natural seismic data−0.878×the normalized surface elevation+0.843×the normalized and plane-gridded Bouguer gravity anomaly data+0.835×the normalized and plane-gridded aeromagnetic anomaly data; and the second principal component data=0.081×the normalized and plane-gridded natural seismic data+0.0395×the normalized surface elevation−0.011×the normalized and plane-gridded Bouguer gravity anomaly data+0.196×the normalized and plane-gridded aeromagnetic anomaly data.

In a specific embodiment, a first principal component threshold value and a second principal component threshold value of the meizoseismal area are respectively 1.52 and 0.91; and that is, when the first principal component is greater than or equal to 1.52 and the second principal component is greater than or equal to 0.91, it indicates in the meizoseismal area.

In a specific embodiment, the clustering analysis of all groups of principal component data is performed in the following manner: a K-means algorithm is used to conduct unsupervised clustering on a cross plot of the two groups of principal component data.

Further, wherein superimposing the surface elevation map and the plane distribution map of the meizoseismal area in the target region with the seismic wave tomography comprises:

determining the distribution of the meizoseismal area in the target region based on the plane distribution map of the meizoseismal area in the target region;

based on the distribution of the meizoseismal area in the target region, acquiring seismic wave tomography profile maps of the meizoseismal area in the target region and its two sides in combination with the seismic wave tomography;

projecting the plane distribution map of the meizoseismal area in the target region onto the surface elevation map to obtain a superimposed map of the surface elevation and the plane distribution of the meizoseismal area; and superimposing the superimposed map of the surface elevation and the plane distribution of the meizoseismal area with the seismic wave tomography profile maps.

Preferably, the above-mentioned earthquake evaluation method based on the multi-type geophysical data further includes: projecting a plane distribution map of different seismic zones in the target region onto a surface elevation map of the target region to obtain a superimposed map of the surface elevation and the different types of seismic zones in the target region.

Further, in accordance with the plane distribution map of the meizoseismal area in the target region, determining a profile passing through the meizoseismal area in the target region, and constructing profile grids; performing profile gridding processing on the natural seismic data about the intraplate earthquakes in accordance with the profile grids to obtain profile-gridded natural seismic data (The longitudinal distribution of the intraplate natural earthquakes in the meizoseismal area can be reflected); wherein the profile gridding processing performed on the natural seismic data about the intraplate earthquakes in accordance with the constructed profile grids comprises: taking an area within a range of 1-50 km away from both sides of the profile as a control range of the profile, and establishing grids with a length of 1-10 km and a longitudinal depth of 0.5-5 km on the profile; for example, an area within a range of 20 km away from both sides of a profile is taken as a control range of the profile, and grids with a length of 5 km and a longitudinal depth of 1 km are established on the profile;

moreover, in accordance with the profile grids, the profile gridding processing performed on the natural seismic data about the intraplate earthquakes comprises:

based on records about natural earthquakes that had occurred in the target region, determining the records about the natural earthquakes that had occurred within the control range of the profile, projecting the records about the natural earthquakes that had occurred within the control range of the profile onto the profile by shaft plumbing, and then determining intraplate earthquake magnitudes of all the grids in the target region so as to obtain the profile-gridded natural seismic data of the meizoseismal area in the target region, quantitative characterization of seismic energy distribution in the target region is accordingly achieved; wherein in the process of determining the intraplate earthquake magnitudes of all the grids in the target region, for each grid in the target region, the intraplate natural earthquakes in the same grid are superimposed in accordance with the energy, and the intraplate earthquake magnitude of the grid is determined based on the superimposed energy; and when the energy obtained by means of superimposition in one grid is zero, the superimposed energy in the grid is defined as 1.

quantitative characterization of seismic energy distribution in the target region is accordingly achieved.

Preferably, the above-mentioned earthquake evaluation method based on the multi-type geophysical data further includes:

making the target region to be subjected to three-dimensional gridding to construct three-dimensional grids of the target region; performing three-dimensional gridding processing on the natural seismic data about the intraplate earthquakes in accordance with the three-dimensional grids of the target region to obtain three-dimensional gridded natural seismic data;

determining a cut-off value for the meizoseismal area with the three-dimensional gridded natural seismic data; and based on the three-dimensional gridded natural seismic data, acquiring a three-dimensional distribution map (which can reflect the three-dimensional distribution characteristics of the meizoseismal area) of the meizoseismal area in the target region by using the cut-off value for the meizoseismal area with the three-dimensional gridded natural seismic data.

More preferably, the method further includes: superimposing the three-dimensional distribution map of the meizoseismal area in the target region with the seismic wave tomography, and analyzing the matching relationship between the meizoseismal area and the crustal geological structure.

In a specific embodiment, the construction of the three-dimensional grids of the target region by making the target region to be subjected to three-dimensional gridding includes: establishing grids with an east-west length of 1-50 km, a north-south length of 1-50 km and a longitudinal depth of 0.1-10 km; and for example, grids with an east-west length of 20 km, a north-south length of 20 km and a longitudinal depth 1 km are established.

In the above-mentioned earthquake evaluation method based on the multi-type geophysical data, preferably, in accordance with the three-dimensional grids of the target region, the three-dimensional gridding processing performed on the natural seismic data about the intraplate earthquakes includes: based on the natural seismic data about intraplate earthquakes that had occurred in the target region, determining intraplate earthquake magnitudes of all the grids in the target region to obtain the magnitude distribution of the intraplate earthquakes that had occurred in the target region, so as to obtain the three-dimensional gridded natural seismic data in the target region, and further achieve quantitative characterization of the seismic energy distribution in the target region, where in the process of determining the intraplate earthquake magnitudes of all the grids in the target region, for each grid in the target region, the intraplate natural earthquakes in the same grid are superimposed in accordance with the energy, and the intraplate earthquake magnitude of the grid is determined based on the superimposed energy;

more preferably, when the energy obtained by means of superimposition in one grid is zero, the superimposed energy in the grid is defined as 1; and in a specific embodiment, the cut-off value for the meizoseismal area with the three-dimensional gridded natural seismic data is 4.

Further, superimposing the three-dimensional distribution map of the meizoseismal area in the target region with the seismic wave tomography, and analyzing the matching relationship between the meizoseismal area and the crustal geological structure; wherein superimposing the three-dimensional distribution map of the meizoseismal area in the target region with the seismic wave tomography comprises:

determining the distribution of the meizoseismal area in the target region based on the three-dimensional distribution map of the meizoseismal area in the target region;

based on the distribution of the meizoseismal area in the target region, acquiring seismic wave tomography profile maps of the meizoseismal area in the target region and its two sides in combination with the seismic wave tomography; and superimposing the three-dimensional distribution map of the meizoseismal area in the target region with the seismic wave tomography profile maps.

In the above-mentioned earthquake evaluation method based on the multi-type geophysical data, preferably, the acquisition, based on the distribution of the meizoseismal area in the target region, of seismic wave tomography profile maps of the meizoseismal area in the target region and its two sides in combination with seismic wave tomography includes:

making the target region to be subjected to three-dimensional gridding to construct the three-dimensional grids of the target region; performing three-dimensional gridding processing on the seismic wave tomography in accordance with the three-dimensional grids of the target region to obtain three-dimensional gridded seismic wave tomography; and based on the distribution of the meizoseismal area in the target region, acquiring the seismic wave tomography profile maps of the meizoseismal area in the target region and its two sides in combination with the three-dimensional gridded seismic wave tomography.

More preferably, in accordance with the three-dimensional grids of the target region, three-dimensional gridding processing performed on the seismic wave tomography includes: based on the seismic wave tomography data in the target region, determining seismic wave tomography values of all the grids in the target region to obtain three-dimensional gridded seismic wave tomography data of the target region, where in the process of determining the seismic wave tomography values of all the grids in the target region, for each grid in the target region, the seismic wave tomography data in the same grid is averaged to obtain an average seismic wave tomography value of the grid as the seismic wave tomography value of the grid; and further preferably, when there is no seismic wave tomography data in one grid, the seismic wave tomography values of six grids which are located above and below grid as well as at the left, right, front and rear of the grid and are adjacent to the grid are taken to calculate a geometric average value as the seismic wave tomography value of the grid.

In a specific embodiment, the construction of the three-dimensional grids of the target region by making the target region to be subjected to three-dimensional gridding includes: establishing grids with an east-west length of 1-50 km, a north-south length of 1-50 km and a longitudinal depth of 0.1-10 km.

In the above-mentioned earthquake evaluation method based on the multi-type geophysical data, preferably, the determination, based on the superimposed energy, of the intraplate earthquake magnitude of the grid is achieved by the following formula:

$$lgE = 4.8 + 1.5M$$

where E is the energy obtained by superimposition, J; and M is the Richter magnitude of an earthquake.

The technical solution provided by the present disclosure is based on the multi-attribute geological-geophysical data for quantitative evaluation, classification and genesis analysis of the intraplate natural earthquakes. Specifically, the method effectively combines seismic energy distribution, surface elevation, Bouguer gravity anomaly and aeromagnetic anomaly to classify the seismic zones and determine seismic development zones, and further combines same with the seismic wave tomography, crustal GPS movement rate and focal mechanism solution to analyze the genesis, thus effectively realizing the quantitative evaluation and analysis of the intraplate natural earthquakes; and therefore, a possibility is provided for the accurate analysis of the intraplate earthquakes, and the intraplate earthquake prediction is further promoted.

BRIEF DESCRIPTION OF DRAWINGS

To more clearly illustrate the technical solution in the embodiments of the present disclosure, the drawings required to use in the description of the embodiments are briefly described below; and it is apparent to those of ordinary skill in the art that the drawings are merely some exemplary embodiments of the present disclosure, and other drawings may also be obtained according to these drawings without creative labor.

DETAILED DESCRIPTION OF THE EMBODIMENTS

To make the object, technical solution and advantages of the embodiments of the present disclosure clearer, the technical solution in the embodiments of the present disclosure will be clearly and completely described below with reference to the drawings in the embodiments of the present disclosure. It is obvious that the described embodiments are part of the present disclosure and not all of it. Based on the embodiments of the present disclosure, all other embodiments obtained by those of ordinary skill in the art without creative labor shall fall within the protection scope of the present disclosure.

The principles and spirit of the present disclosure will be described in detail below with reference to several exemplary embodiments of the present disclosure.

Figure 1:
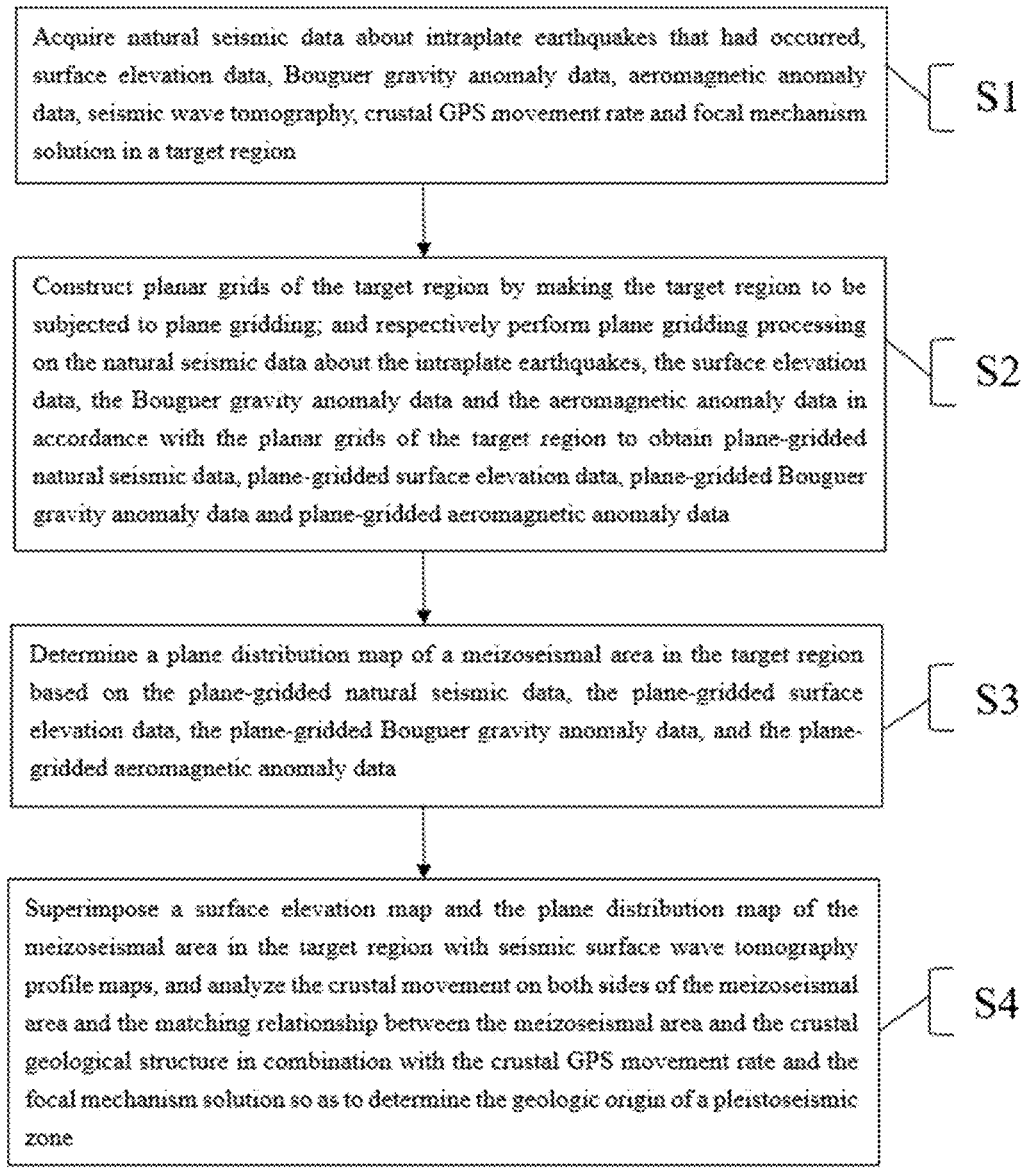
FIG. 1 shows a schematic flowchart of an earthquake evaluation method based on multi-type geophysical data provided by an embodiment of the present disclosure.

Referring to FIG. 1, an embodiment of the present disclosure provides an earthquake evaluation method based on multi-type geophysical data, including:

Step 1 (S1): acquiring natural seismic data about intraplate earthquakes that had occurred, surface elevation data, Bouguer gravity anomaly data, aeromagnetic anomaly data, seismic wave tomography, crustal GPS movement rate and focal mechanism solution in a target region, where the seismic wave tomography comprises seismic surface wave tomography and/or seismic body wave tomography;

Step 2 (S2): constructing planar grids of the target region by making the target region to be subjected to plane gridding; respectively performing plane gridding processing on the natural seismic data about the intraplate earthquakes, the surface elevation data, the Bouguer gravity anomaly data and the aeromagnetic anomaly data in accordance with the planar grids of the target region to obtain plane-gridded natural seismic data, plane-gridded surface elevation data, plane-gridded Bouguer gravity anomaly data and plane-gridded aeromagnetic anomaly data;

Step 3 (S3): determining a plane distribution map of a meizoseismal area in the target region based on the plane-gridded natural seismic data, the plane-gridded surface elevation data, the plane-gridded Bouguer gravity anomaly data, and the plane-gridded aeromagnetic anomaly data; and Step 4 (S4): superimposing a surface elevation map and the plane distribution map of the meizoseismal area in the target region with the seismic wave tomography, and analyzing the crustal movement on both sides of the meizoseismal area and the matching relationship between the meizoseismal area and the crustal geological structure in combination with the crustal GPS movement rate and the focal mechanism solution so as to determine the geologic origin of a pleistoseismic zone.

In the step S3, the plane distribution map of the meizoseismal area in the target region refers to a map that can reflect the distribution characteristics of the meizoseismal area in the target region on the plane; and you can either choose a map which can only reflect the plane distribution characteristics of the meizoseismal area, or choose a map that can both reflect the plane distribution characteristics of the meizoseismal area and other types of seismic zones (for example, the plane distribution map of different types of seismic zones in the target region).

In the step S1, the natural seismic data about the intraplate earthquakes can be derived from the report of the International Seismological Center (ISC), the CMT solutions of the Harvard University and the US Geological Survey, and the results obtained by analytical processing of the China Earthquake Administration and its provincial bureaus.

In the step S1, the surface elevation data: the surface elevation can reflect the fluctuation of fixed objects on the surface; and according to different contour curve shapes, the visualization of the surface topography can be realized. The surface elevation data can come directly from a global topographic relief model ETOPO released by the US National Geophysical Data Center (NGDC); and the model integrates numerous global and regional datasets, is constructed on the basis of land topography and bathymetry, and adopts a UTM/WGS84 coordinate system with an accuracy of 1'×1'.

In the step S1, the Bouguer gravity anomaly data: Bouguer gravity anomaly is obtained after latitude correction, terrain correction and Bouguer correction. It mainly reflects the influence of abnormal mass inside the earth on the results of gravity measurement, and its wide range variation mainly reflects the fluctuation of Moho discontinuity. Bouguer gravity anomaly data can be collected from the national regional gravity database of China Geological Survey, with a data accuracy of $\pm 2 \times 10^{-5}$ m/s$^2$.

In the step S1, the aeromagnetic anomaly data: a lithospheric magnetic field mainly reflects the distribution of the magnetization (magnetic susceptibility or magnetic moment) of rocks in the lithosphere; and due to the differences in the magnetization environment (referring to the external magnetic field of the rocks and its change with time when the rocks are magnetized) of the rocks, magnetic carriers and geological process that the magnetic carriers undergo as well as tectonic evolution, the geological structure and geodynamic information, such as rock mineral composition, rock structure, temperature and pressure states, the metamorphism of the deep rocks as well as the tectonic movement and evolution process experienced by the lithospheric magnetic field, about the lithospheric magnetic field can be obtained. The aeromagnetic anomaly data can be collected from the Airborne Geophysical and Remote Sensing Center of the Ministry of Land and Resources of PRC, and the data grid is 2 km×2 km.

In the step S1, the seismic surface wave tomography: the underground structure is studied by using background noise, that is, the cross-correlation calculation of long-term seismic noise records of two stations is carried out; and a Green function between the stations is extracted to obtain surface wave dispersion characteristics, and further tomography or measurement of surface wave travel time change is performed to obtain a crust-mantle velocity structure and realize the monitoring of an underground medium. Shen et al. (2016) used data from more than 2,000 seismic stations distributed throughout China (CEArray, China Array, NECESS, PASSCAL, GSN) and surrounding areas (Korean earthquake Network, F-Net, KNET) to plot an isotropic Rayleigh wave group with a period of 8-50 s and a phase velocity diagram, the isotropic Rayleigh wave group covering the entire China, extending eastward across the Korean peninsula and entering the marginal seas all the way to Japan; this set of model shows great diversity and quite abundant velocity structures in the crust and the mantle lithosphere. For example, it clearly shows the low-velocity anomaly in the Sichuan Basin of the South China Continent and the high-velocity anomaly below it. The seismic surface wave tomography used in the present disclosure can directly use the three-dimensional data of China surface wave tomography disclosed by Shen et al. (2016), with data sampling of 0.5°×0.5°, a vertical sampling interval of 1 km, and a depth of 150 km deep from the surface to the underground.

In the step S1, the seismic body wave tomography: seismic tomography uses a layer-by-layer seismic data analysis method to draw images of the interior of the earth and invert the velocity structure of the geological body inside the earth; the detailed information of the velocity structure of the geological body can provide an important perspective for the deep geological structure and dynamic evolution of the earth; high-resolution body wave tomography can be used for the study on the mantle structure of the earth, so that more detailed information about the upper mantle structure is revealed, and the deformation of the interior of the earth and the overall geodynamic evolution can be better reflected; and the depth of seismic body wave tomography can reach 1000 km from the surface to the underground.

In the step S1, the crustal GPS movement rate: GPS continuous observation data with high precision up to sub-centimeters or even millimeters can be used for the extraction of crustal deformation information and the analysis of dynamic characteristics such as crustal displacement, stress and strain field, which provides a revolutionary technical means for the quantitative study on the present-day horizontal movement and tectonic deformation of the crust; for example, Wang and Shen (2020) has strictly processed nearly 25 years of GPS observation data within the territory of China, the long-term velocity of the stations is obtained; and the obtained velocity solution with high spatial resolution and consistency can reveal modes such as the westward compression of the Qinghai-Tibet Plateau, the rotation of the southeastern boundary of the Qinghai-Tibet Plateau and the internal deformation of the South China Continent, so that the pre-earthquake, coseismic and post-earthquake deformation can be obtained, and an important basis is provided for the study of the intraplate earthquakes. The set of latest GPS data within the territory of China provided by Wang and Shen (2020), including 2403 data points with an accuracy of 0.1 mm/yr, can be directly adopted as the crustal GPS movement rate used in the present disclosure.

In the step S1, the focal mechanism solution: a focal mechanism describes the nature and source of a fracture process, which is an important basis for understanding of the focal area and seismogenic fault stress state; when a fault-related event occurs, the focal mechanism refers to the direction and slip vector of a sliding fault plane, also known as a fault plane solution. The focal mechanism solution used in the present disclosure can adopt the report of the International Seismological Center (ISC), and the focal mechanism solutions analytically processed by the Harvard University, the US Geological Survey, and China Earthquake Administration and its provincial bureaus.

In the step S4, the geologic origin determination of the pleistoseismic zone through analysis of the crustal movement on both sides of the meizoseismal area and the matching relationship between the meizoseismal area and the crustal geological structure can be achieved in the following manner:

determining the crustal geological structure of the meizoseismal area on the basis of the surface elevation change of the distribution zone of the meizoseismal area and the two sides thereof as well as the changing situation of the seismic wave tomography, so as to obtain the matching relationship between the meizoseismal area and the crustal geological structure; determining the crustal movement on both sides of the meizoseismal area in combination with the crustal GPS movement rate; and based on the matching relationship between the meizoseismal area and the crustal geological structure and the crustal movement on both sides of the meizoseismal area, determinating the geologic origin of the pleistoseismic zone in combination of the focal mechanism solution.

Further, the construction of the planar grids of the target region by making the target region to be subjected to plane gridding includes: establishing grids at 0.01°-0.1° in the east-west direction and at 0.01°-0.1° in the north-south direction; and for example, plane gridding processing includes: establishing grids at 0.05° (that is, the width is 5.55×cos θ km, and θ is the latitude of the point) in the east-west direction and at 0.05° (that is, the length is 5.55 km) in the north-south direction.

Further, in accordance with the planar grids of the target region, the plane gridding processing performed on the natural seismic data about the intraplate earthquakes includes:

based on the natural seismic data about the intraplate earthquakes that had occurred in the target region, determining intraplate earthquake magnitudes of all the grids in the target region to obtain the magnitude distribution of the intraplate earthquakes that had occurred in the target region, so as to obtain the plane-gridded natural seismic data in the target region, and further achieve quantitative characterization of seismic energy distribution in the target region, where in the process of determining the intraplate earthquake magnitudes of all the grids in the target region, for each grid in the target region, the intraplate natural earthquakes in the same grid are superimposed in accordance with the energy, and the intraplate earthquake magnitude of the grid is determined based on the superimposed energy; and even further, when the energy obtained by means of superimposition in one grid is zero, the superimposed energy in the grid is defined as 1.

Further, in accordance with the planar grids of the target region, the plane gridding processing performed on the surface elevation data includes:

based on the surface elevation data in the target region, determining surface elevation values of all the grids in the target region to obtain the plane-gridded surface elevation data in the target region, where in the process of determining the surface elevation values of all the grids in the target region, for each grid in the target region, the surface elevation data in the same grid is averaged to obtain an average surface elevation value of the grid as the surface elevation value of the grid; and even further, when there is no surface elevation data in one grid, the surface elevation values of four grids which are located in the east, west, south and north of the grid and are adjacent to the grid are taken to calculate a geometric average value as the surface elevation value of the grid.

Further, in accordance with the planar grids of the target region, the plane gridding processing performed on the Bouguer gravity anomaly data includes:

based on the surface elevation data in the target region, determining Bouguer gravity anomaly values of all the grids in the target region to obtain the plane-gridded Bouguer gravity anomaly data in the target region, where in the process of determining the Bouguer gravity anomaly values of all the grids in the target region, for each grid in the target region, the Bouguer gravity anomaly data in the same grid is averaged to obtain an average Bouguer gravity anomaly value of the grid as the Bouguer gravity anomaly value of the grid; and even further, when there is no Bouguer gravity anomaly data in one grid, the Bouguer gravity anomaly values of four grids which are located in the east, west, south and north of the grid and are adjacent to the grid are taken to calculate a geometric average value as the Bouguer gravity anomaly value of the grid.

Further, in accordance with the planar grids of the target region, the plane gridding processing performed on the aeromagnetic anomaly data includes:

based on the surface elevation data in the target region, determining aeromagnetic anomaly values of all the grids in the target region to obtain the plane-gridded aeromagnetic anomaly data in the target region, where in the process of determining the aeromagnetic anomaly values of all the grids in the target region, for each grid in the target region, the aeromagnetic anomaly data in the same grid is averaged to obtain an average aeromagnetic anomaly value of the grid as the aeromagnetic anomaly value of the grid; and even further, when there is no aeromagnetic anomaly data in one grid, the aeromagnetic anomaly values of four grids which are located in the east, west, south and north of the grid and are adjacent to the grid are taken to calculate a geometric average value as the aeromagnetic anomaly value of the grid.

Further, the Step 3 (S3) includes:

normalizing the plane-gridded natural seismic data, the plane-gridded surface elevation data, the plane-gridded Bouguer gravity anomaly data and the plane-gridded aeromagnetic anomaly data respectively to obtain normalized and plane-gridded natural seismic data, normalized and plane-gridded surface elevation data, normalized and plane-gridded Bouguer gravity anomaly data, and normalized and plane-gridded aeromagnetic anomaly data;

performing dimensionality reduction on the normalized and plane-gridded natural seismic data, the normalized and plane-gridded surface elevation data, the normalized and plane-gridded Bouguer gravity anomaly data, and the normalized and plane-gridded aeromagnetic anomaly data by using a principal component analysis method to obtain first principal component data and second principal component data;

performing cluster analysis on all groups of principal component data, determining a first principal component threshold value and a second principal component threshold value of the meizoseismal area, and dividing the target region into the meizoseismal area and a non-meizoseismal area to obtain the plane distribution map of the meizoseismal area in the target region;

even further, the process of performing the cluster analysis on all the groups of principal component data further includes: determining first principal component threshold values and second principal component threshold values of a moderate earthquake area and a weak earthquake area, and further dividing the non-meizoseismal area in the target region into the moderate earthquake area, the weak earthquake area and an aseismic area so as to obtain a plane distribution map of different types of seismic zones in the target region;

at this point, the Step 3 (S3) includes:

normalizing the plane-gridded natural seismic data, the plane-gridded surface elevation data, the plane-gridded Bouguer gravity anomaly data and the plane-gridded aeromagnetic anomaly data respectively to obtain normalized and plane-gridded natural seismic data, normalized and plane-gridded surface elevation data, normalized and plane-gridded Bouguer gravity anomaly data, and normalized and plane-gridded aeromagnetic anomaly data;

performing dimensionality reduction on the normalized and plane-gridded natural seismic data, the normalized and plane-gridded surface elevation data, the normalized and plane-gridded Bouguer gravity anomaly data, and the normalized and plane-gridded aeromagnetic anomaly data by using the principal component analysis method to obtain the first principal component data and the second principal component data;

performing the cluster analysis on all the groups of principal component data to determine the first principal component threshold values and the second principal component threshold values of the meizoseismal area, the moderate earthquake area and the weak earthquake area, and further dividing the target region into four classes, i.e., the meizoseismal area, the moderate earthquake area, the weak earthquake area and the aseismic area so as to obtain the plane distribution map (which can reflect the distribution characteristics of the different types of seismic zones on the plane, including the distribution characteristics of the meizoseismal area on the plane) of different types of seismic zones in the target region;

in the Step 3 (S3), the clustering analysis of all the groups of principal component data is performed in the following manner: a K-means algorithm is used to conduct unsupervised clustering on a cross plot of the two groups of principal component data;

in the Step 3 (S3), normalization is performed to normalize the data to a range of 0-1;

in the Step 3 (S3), the expressions for the determination of a first principal component and a second principal component are preferably as follows:

the first principal component data=0.91×the normalized and plane-gridded natural seismic data−0.878×the normalized surface elevation+0.843×the normalized and plane-gridded Bouguer gravity anomaly data+0.835×the normalized and plane-gridded aeromagnetic anomaly data; and the second principal component data=0.081×the normalized and plane-gridded natural seismic data+0.0395×the normalized surface elevation−0.011×the normalized and plane-gridded Bouguer gravity anomaly data+0.196×the normalized and plane-gridded aeromagnetic anomaly data.

In a specific embodiment, the first principal component threshold value and the second principal component threshold value of the meizoseismal area are respectively 1.52 and 0.91; that is, when the first principal component is greater than or equal to 1.52 or the second principal component is greater than or equal to 0.91, it indicates in the meizoseismal area.

In a specific embodiment, the first principal component threshold value and the second principal component threshold value of the meizoseismal area are respectively 1.52 and 0.91; the first principal component threshold value and the second principal component threshold value of the moderate earthquake area are respectively 0.47 and 0.43; the first principal component threshold value and the second principal component threshold value of the weak earthquake area are respectively −1.32 and −0.21; that is, when the first principal component is greater than or equal to 1.52 or the second principal component is greater than or equal to 0.91, it indicates in the meizoseismal area; when the first principal component is greater than or equal to 0.47 and less than 1.52 or the second principal component is greater than or equal to 0.43 and less than 0.91, it indicates in the moderate earthquake area; and when the first principal component is greater than or equal to −1.32 and less than 0.47 or the second principal component is greater than or equal to −0.21 and less than 0.43, it indicates in the weak earthquake area.

Further, superimposing the surface elevation map and the plane distribution map of the meizoseismal area in the target region with the seismic wave tomography includes:

determining the distribution of the meizoseismal area in the target region based on the plane distribution map of the meizoseismal area in the target region;

based on the distribution of the meizoseismal area in the target region, acquiring seismic wave tomography profile maps of the meizoseismal area in the target region and its two sides in combination with the seismic wave tomography;

projecting the plane distribution map of the meizoseismal area in the target region onto the surface elevation map to obtain a superimposed map of the surface elevation and the plane distribution of the meizoseismal area; and superimposing the superimposed map of the surface elevation and the plane distribution of the meizoseismal area with the seismic wave tomography profile maps.

Further, the method further includes: projecting the plane distribution map of the different seismic zones in the target region onto the surface elevation map of the target region to obtain a superimposed map of the surface elevation and the different types of seismic zones in the target region.

Further, the method further includes: in accordance with the plane distribution map of the meizoseismal area in the target region, determining a profile passing through the meizoseismal area in the target region, and constructing profile grids; and performing profile gridding processing on the natural seismic data about the intraplate earthquakes in accordance with the profile grids to obtain profile-gridded natural seismic data (which can reflect the longitudinal distribution of the intraplate natural earthquakes in the meizoseismal area).

Even further, the profile gridding processing performed on the natural seismic data about the intraplate earthquakes in accordance with the constructed profile grids includes: taking an area within a range of 1-50 km away from both sides of the profile as a control range of the profile, and establishing grids with a length of 1-10 km and a longitudinal depth of 0.5-5 km on the profile; and for example, an area within a range of 20 km away from both sides of a profile is taken as a control range of the profile, and grids with a length of 5 km and a longitudinal depth of 1 km are established on the profile.

Even further, in accordance with the profile grids, the profile gridding processing performed on the natural seismic data about the intraplate earthquakes includes:

based on records about natural earthquakes that had occurred in the target region, determining the records about the natural earthquakes that had occurred within the control range of the profile, projecting the records about the natural earthquakes that had occurred within the control range of the profile onto the profile by shaft plumbing, and then determining intraplate earthquake magnitudes of all the grids in the target region, so as to obtain the profile-gridded natural seismic data of the meizoseismal area in the target region, and further achieve quantitative characterization of the seismic energy distribution in the target region, where in the process of determining the intraplate earthquake magnitudes of all the grids in the target region, for each grid in the target region, the intraplate natural earthquakes in the same grid are superimposed in accordance with the energy, and the intraplate earthquake magnitude of the grid is determined based on the superimposed energy; and even further, when the energy obtained by means of superimposition in one grid is zero, the superimposed energy in the grid is defined as 1.

Further, the method further includes:

making the target region to be subjected to three-dimensional gridding to construct three-dimensional grids of the target region; performing three-dimensional gridding processing on the natural seismic data about the intraplate earthquakes in accordance with the three-dimensional grids of the target region to obtain three-dimensional gridded natural seismic data;

determining a cut-off value for the meizoseismal area with the three-dimensional gridded natural seismic data; and based on the three-dimensional gridded natural seismic data, acquiring a three-dimensional distribution map (which can reflect the three-dimensional distribution characteristics of the meizoseismal area) of the meizoseismal area in the target region by using the cut-off value for the meizoseismal area with the three-dimensional gridded natural seismic data.

Even further, the method further includes: superimposing the three-dimensional distribution map of the meizoseismal area in the target region with the seismic wave tomography, and analyzing the matching relationship between the meizoseismal area and the crustal geological structure.

Even further, the construction of the three-dimensional grids of the target region by making the target region to be subjected to three-dimensional gridding includes: establishing the grids with an east-west length of 1-50 km, a north-south length of 1-50 km and a longitudinal depth of 0.1-10 km; and for example, grids with an east-west length of 20 km, a north-south length of 20 km and a longitudinal depth of 1 km are established.

Even further, in accordance with the three-dimensional grids of the target region, the three-dimensional gridding processing performed on the natural seismic data about the intraplate earthquakes comprises: based on the natural seismic data about intraplate earthquakes that had occurred in the target region, determining intraplate earthquake magnitudes of all the grids in the target region to obtain the magnitude distribution of the intraplate earthquakes that had occurred in the target region, so as to obtain the three-dimensional gridded natural seismic data in the target region, and further achieve quantitative characterization of the seismic energy distribution in the target region, wherein in the process of determining the intraplate earthquake magnitudes of all the grids in the target region, for each grid in the target region, the intraplate natural earthquakes in the same grid are superimposed in accordance with the energy, and the intraplate earthquake magnitude of the grid is determined based on the superimposed energy;

even further, when the energy obtained by means of superimposition in one grid is zero, the superimposed energy in the grid is defined as 1; and even further, the cut-off value for the meizoseismal area with the three-dimensional gridded natural seismic data is 4.

Further, superimposing the three-dimensional distribution map of the meizoseismal area in the target region with the seismic wave tomography includes:

determining the distribution of the meizoseismal area in the target region based on the three-dimensional distribution map of the meizoseismal area in the target region;

based on the distribution of the meizoseismal area in the target region, acquiring seismic wave tomography profile maps of the meizoseismal area in the target region and its two sides in combination with the seismic wave tomography; and superimposing the three-dimensional distribution map of the meizoseismal area in the target region with the seismic wave tomography profile maps.

Further, the acquisition, based on the distribution of the meizoseismal area in the target region, of the seismic wave tomography profile maps of the meizoseismal area in the target region and its two sides in combination with the seismic wave tomography includes:

making the target region to be subjected to three-dimensional gridding to construct the three-dimensional grids of the target region; performing three-dimensional gridding processing on the seismic wave tomography in accordance with the three-dimensional grids of the target region to obtain three-dimensional gridded seismic wave tomography; and based on the distribution of the meizoseismal area in the target region, acquiring seismic wave tomography profile maps of the meizoseismal area in the target region and its two sides in combination with the three-dimensional gridded seismic wave tomography.

Even further, the construction of the three-dimensional grids of the target region by making the target region to be subjected to three-dimensional gridding includes: establishing the grids with an east-west length of 1-50 km, a north-south length of 1-50 km and a longitudinal depth of 0.1-10 km.

Even further, in accordance with the three-dimensional grids of the target region, the three-dimensional gridding processing performed on the seismic wave tomography includes: based on the seismic wave tomography data in the target region, determining seismic wave tomography values of all the grids in the target region to obtain three-dimensional gridded seismic wave tomography data of the target region, where in the process of determining the seismic wave tomography values of all the grids in the target region, for each grid in the target region, the seismic wave tomography data in the same grid is averaged to obtain an average seismic wave tomography value of the grid as the seismic wave tomography value of the grid; and even further more, when there is no seismic wave tomography data in one grid, the seismic wave tomography values of six grids which are located above and below grid as well as at the left, right, front and rear of the grid and are adjacent to the grid are taken to calculate a geometric average value as the seismic wave tomography value of the grid.

Further, the determination, based on the superimposed energy, of the intraplate earthquake magnitude of the grid is achieved by the following formula:

$$lgE = 4.8 + 1.5M$$

where E is the energy obtained by superimposition, J; and M is the Richter magnitude of an earthquake.

Embodiment 1

The embodiment provides an earthquake evaluation method based on multi-type geophysical data, which is used to analyze and evaluate intraplate earthquakes within the territory of China.

Figure 2:
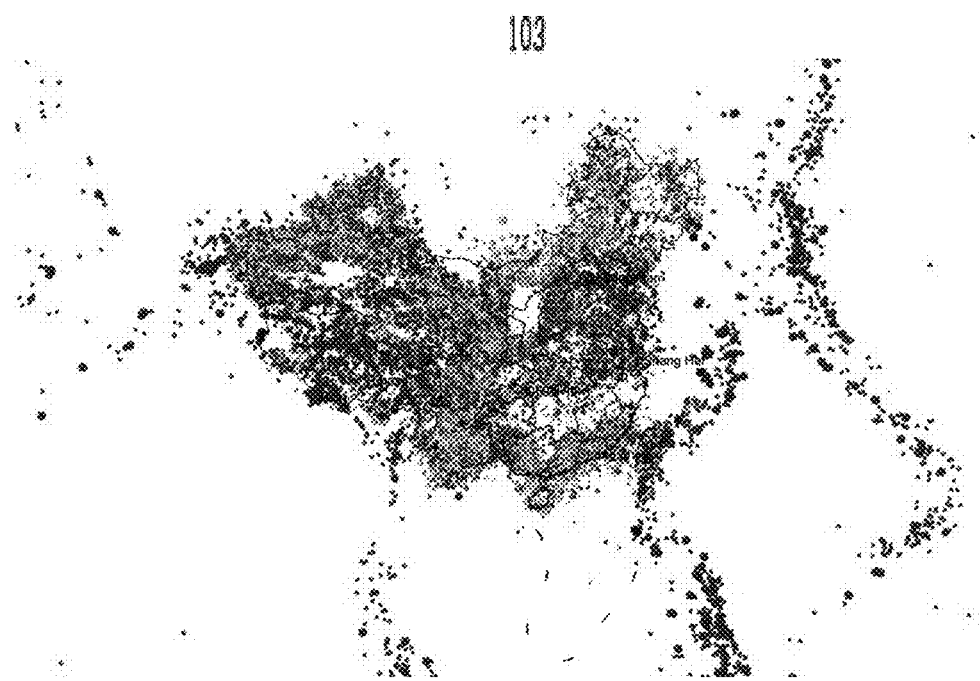
FIG. 2 shows a projection diagram of natural seismic data in a target region as described in the embodiment 1 of the present disclosure.

Specifically, the earthquake evaluation method based on the multi-type geophysical data provided by the embodiment includes:

1. acquiring natural seismic data about intraplate earthquakes that had occurred, surface elevation data, Bouguer gravity anomaly data, aeromagnetic anomaly data, seismic wave tomography, crustal GPS movement rate and focal mechanism solution within the territory of China; where the natural seismic data about the intraplate earthquakes that had occurred in China is collected from the report of the International Seismological Center (ISC), the CMT solutions of the Harvard University and the US Geological Survey, and the results obtained by analytical processing of the China Earthquake Administration and its provincial bureaus. A total of 650,000 records (as shown in FIG. 2) about the earthquakes that had occurred within the territory of China since 1965 have been collected;

the surface elevation data is collected from a global topographic relief model ETOPO1 released by the US National Geophysical Data Center (NGDC); the model integrates numerous global and regional datasets, is constructed on the basis of land topography and bathymetry, and adopts a UTM/WGS84 coordinate system with an accuracy of 1'×1';

Bouguer gravity anomaly data is collected from regions within the territory of China, and the source of the gravity data comes from national regional gravity database of China Geological Survey, with a data accuracy of $\pm 2 \times 10^{-5}$ m/s$^2$;

the aeromagnetic anomaly data is collected from the Airborne Geophysical and Remote Sensing Center of the Ministry of Land and Resources of PRC, and the data grid is 2 km×2 km;

the seismic surface wave tomography is collected from the three-dimensional data of China surface wave tomography disclosed by Shen et al. (Weisen Shen, Michael H. Ritzwoller, Dou Kang, YoungHee Kim, Fan-Chi Lin, Jieyuan Ning, Weitao Wang, Yong Zheng, Longquan Zhou. A seismic reference model for the crust and uppermost mantle beneath China from surface wave dispersion. Geophysical Journal International, 2016, 206 (2): 954-979), with data sampling of 0.5°×0.5°, a vertical sampling interval of 1 km, and a depth of 150 km deep from the surface to the underground;

the crustal GPS movement rate is collected from the latest GPS data within the territory of China provided by Wang and Shen (Min Wang, Shen, Zheng-Kang Shen. Present-Day Crustal Deformation of Continental China Derived From GPS and Its Tectonic Implications. Journal of Geophysical Research: Solid Earth, 2020, 125 (2): 1-22), including 2403 data points with an accuracy of 0.1 mm/yr; and the focal mechanism solution is collected from the report of the International Seismological Center (ISC), and the focal mechanism solutions analytically processed by the Harvard University, the US Geological Survey, and China Earthquake Administration and its provincial bureaus, and 3115 focal mechanism solutions within the territory of China are obtained.

Figure 3A:
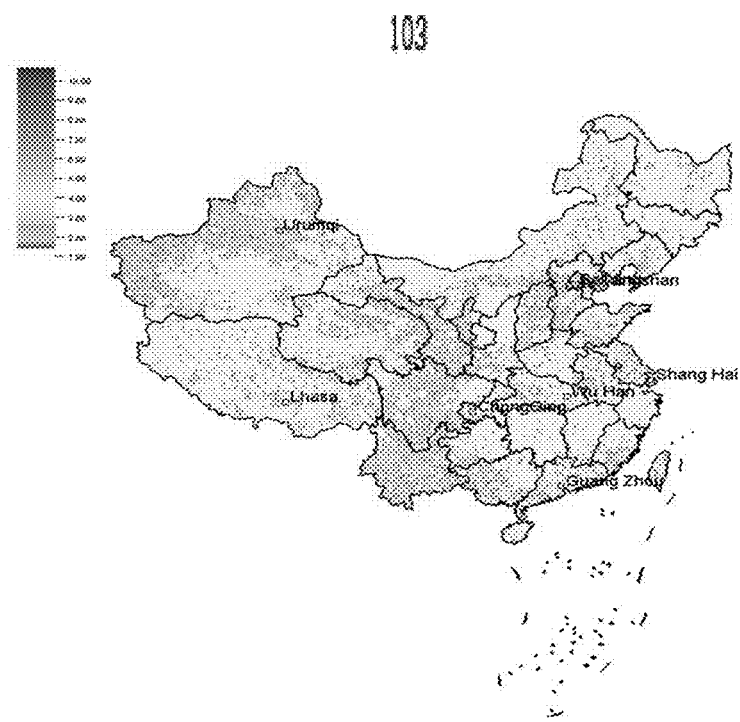
FIG. 3A shows a plane-gridded distribution map of earthquake magnitudes in the target region as described in the embodiment 1 of the present disclosure.
Figure 3B:
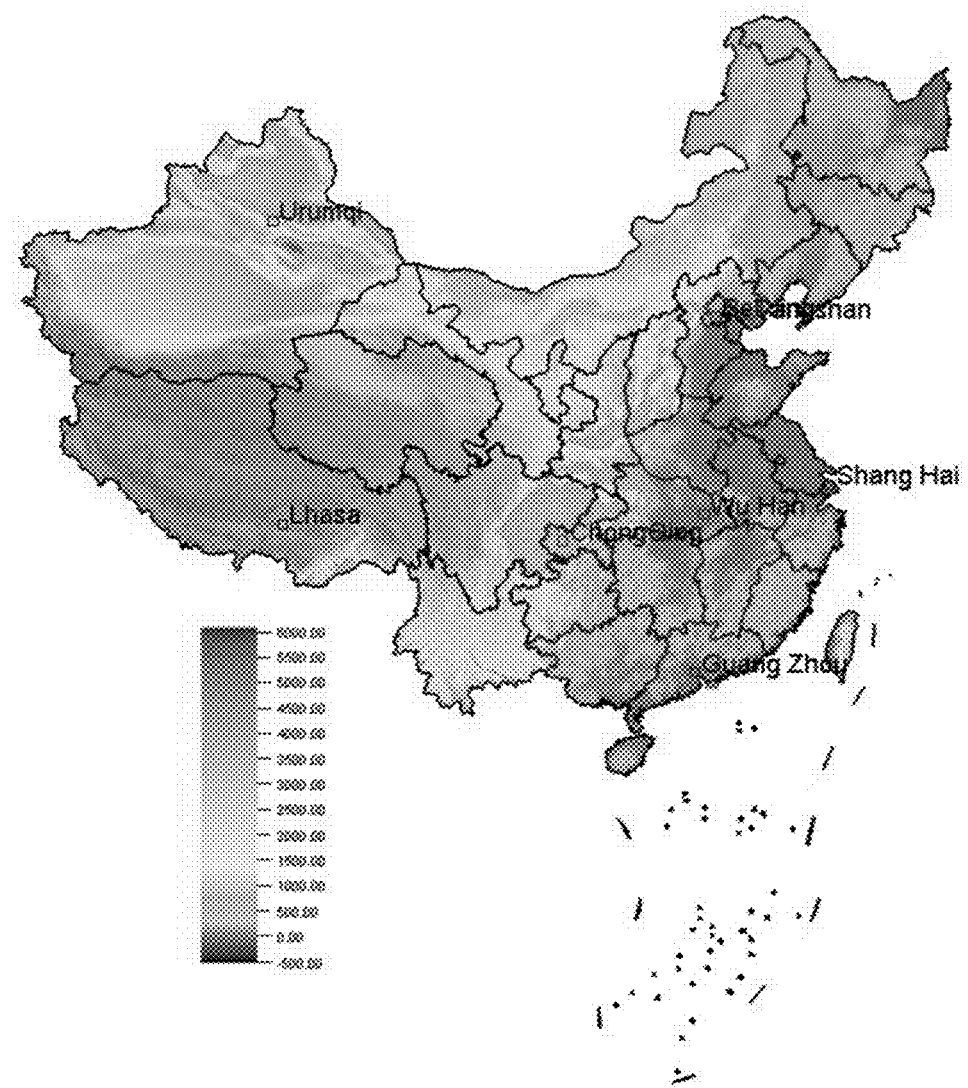
FIG. 3B shows a plane-gridded surface elevation data map in the target region as described in the embodiment 1 of the present disclosure.
Figure 3C:
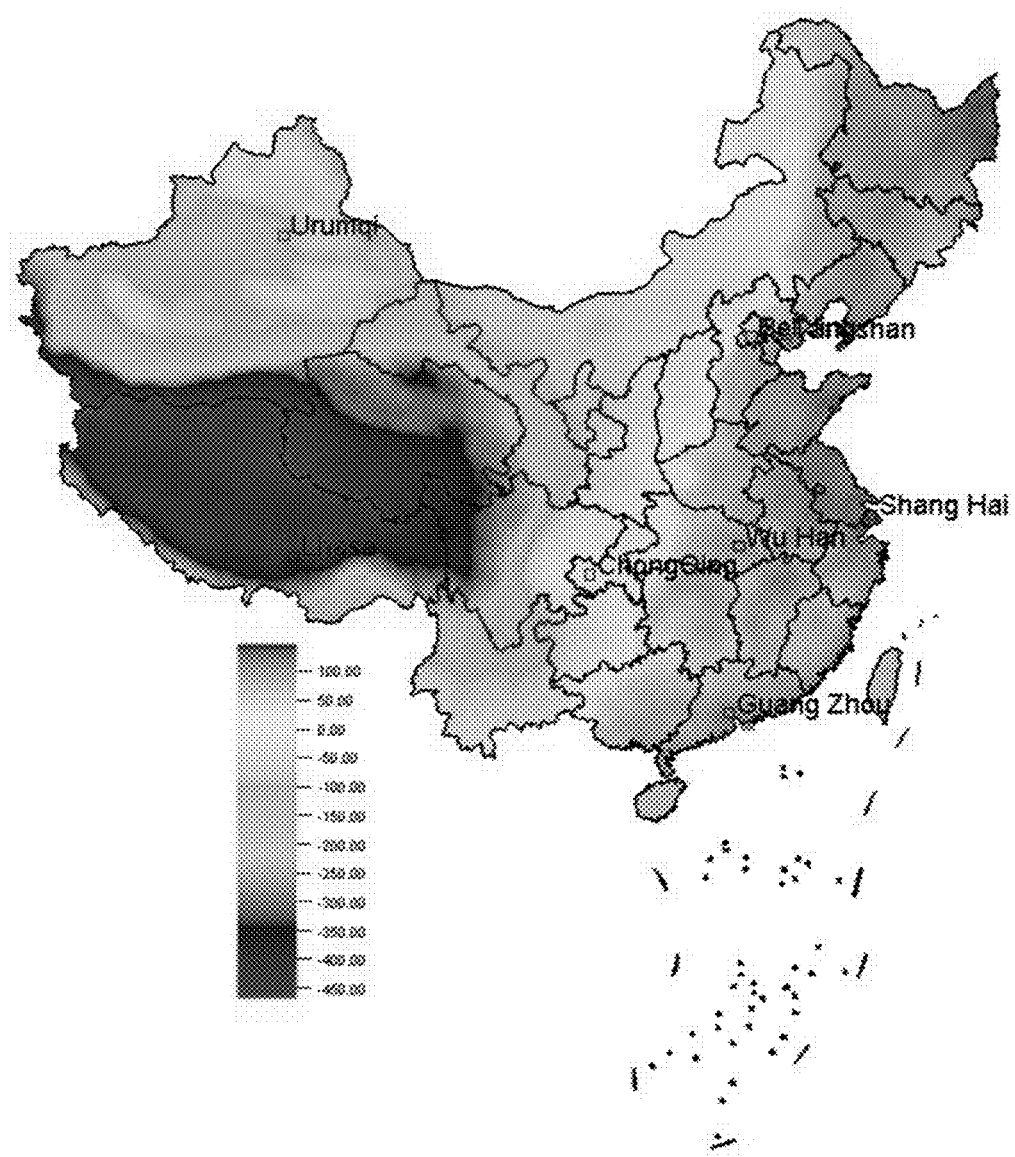
FIG. 3C shows a plane-gridded Bouguer gravity anomaly data map in the target region as described in the embodiment 1 of the present disclosure.
Figure 3D:
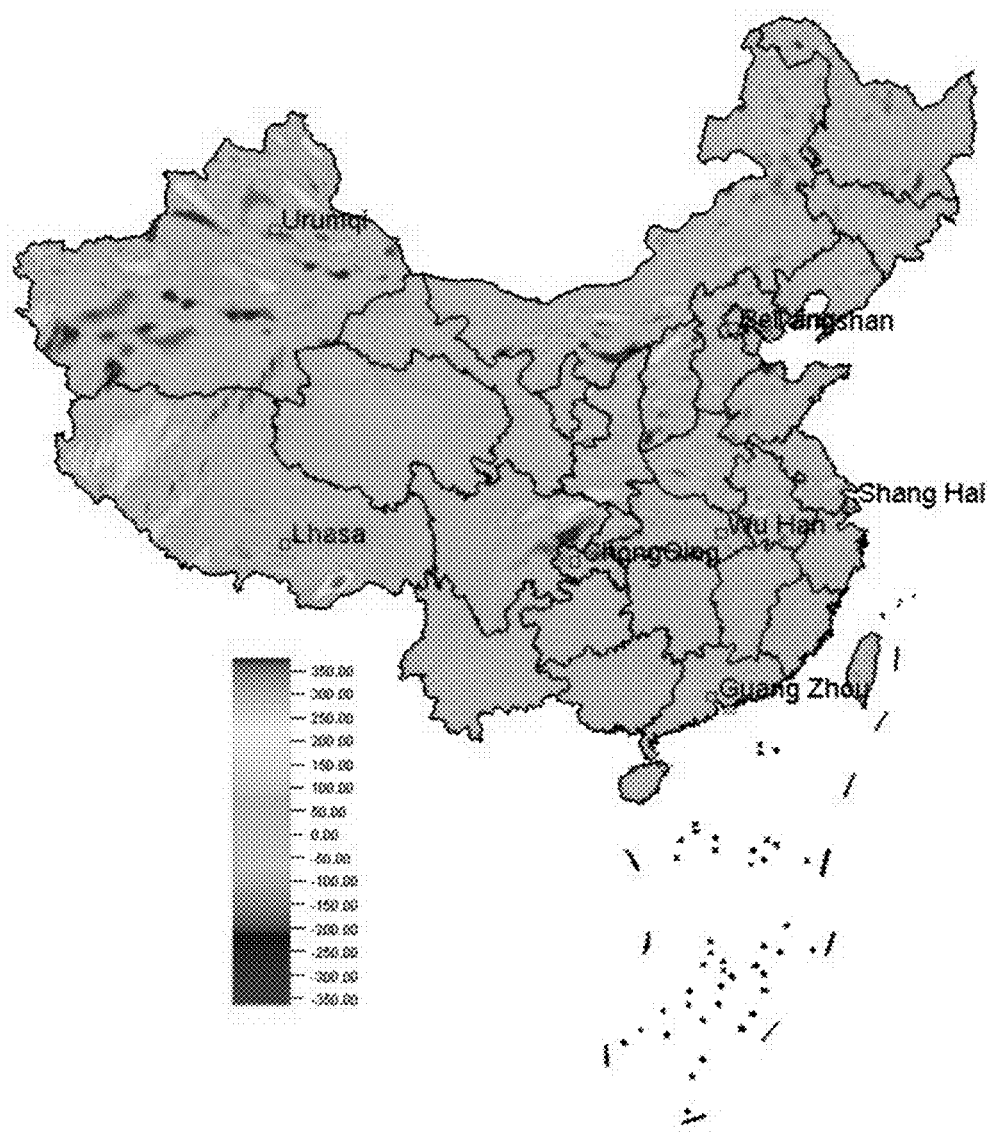
FIG. 3D shows a plane-gridded aeromagnetic anomaly data map in the target region as described in the embodiment 1 of the present disclosure.

2. Performing plane gridding processing:

constructing planar grids within the territory of China: establishing grids at 0.05° in the east-west direction (that is, the width is 5.55×cos θ km, and θ is the latitude of the point), and at 0.05° in the north-south direction (that is, the length is 5.55 km);

respectively performing plane gridding processing on the natural seismic data about the intraplate earthquakes, the surface elevation data, the Bouguer gravity anomaly data and the aeromagnetic anomaly data in accordance with the planar grids within the territory of China to obtain plane-gridded natural seismic data, plane-gridded surface elevation data, plane-gridded Bouguer gravity anomaly data and plane-gridded aeromagnetic anomaly data; where the plane gridding processing performed on the natural seismic data about the intraplate earthquakes includes: based on the natural seismic data about the intraplate earthquakes that had occurred within the territory of China, determining intraplate earthquake magnitudes of all the grids within the territory of China to obtain the magnitude distribution of the intraplate earthquakes that had occurred within the territory of China, where in the process of determining the intraplate earthquake magnitudes of all the grids, for each grid, the seismic records in the same grid are superimposed in accordance with the energy, and the intraplate earthquake magnitude of the grid is determined based on the superimposed energy; when the energy obtained by means of superimposition in one grid is zero, the superimposed energy in the grid is defined as 1; the earthquake magnitude is determined by the following formula: lgE=4.8+1.5M, where E is the energy obtained by superimposition, J; and M is the Richter magnitude of an earthquake; the results are shown in FIG. 3A;

the plane gridding processing performed on the surface elevation data is achieve in the following manner: for all the grids within the territory of China, averaging the surface elevation data in the same grid to obtain an average surface elevation value of the grid as the surface elevation value of the grid, so as to obtain plane-gridded surface elevation data within the territory of China, where when there is no surface elevation data in one grid, the surface elevation values of four grids which are located in the east, west, south and north of the grid and are adjacent to the grid are taken to calculate a geometric average value as the surface elevation value of the grid; the results are shown in FIG. 3B;

the plane gridding processing performed on the Bouguer gravity anomaly data is achieve in the following manner: for all the grids within the territory of China, averaging the Bouguer gravity anomaly data in the same grid to obtain an average Bouguer gravity anomaly value of the grid as the Bouguer gravity anomaly value of the grid, so as to obtain plane-gridded Bouguer gravity anomaly data within the territory of China, where when there is no Bouguer gravity anomaly data in one grid, the Bouguer gravity anomaly values of four grids which are located in the east, west, south and north of the grid and are adjacent to the grid are taken to calculate a geometric average value as the Bouguer gravity anomaly value of the grid; the results are shown in FIG. 3C;

the plane gridding processing performed on the aeromagnetic anomaly data is achieve in the following manner: for all the grids within the territory of China, averaging the aeromagnetic anomaly data in the same grid to obtain an average aeromagnetic anomaly value of the grid as the aeromagnetic anomaly value of the grid, so as to obtain plane-gridded aeromagnetic anomaly data within the territory of China, where when there is no aeromagnetic anomaly data in one grid, the aeromagnetic anomaly values of four grids which are located in the east, west, south and north of the grid and are adjacent to the grid are taken to calculate a geometric average value as the aeromagnetic anomaly value of the grid; and the results are shown in FIG. 3D.

3. Normalizing the plane-gridded natural seismic data, the plane-gridded surface elevation data, the plane-gridded Bouguer gravity anomaly data and the plane-gridded aeromagnetic anomaly data respectively to obtain normalized and plane-gridded natural seismic data, normalized and plane-gridded surface elevation data, normalized and plane-gridded Bouguer gravity anomaly data, and normalized and plane-gridded aeromagnetic anomaly data; where the plane-gridded natural seismic data, the plane-gridded surface elevation data, the plane-gridded Bouguer gravity anomaly data and the plane-gridded aeromagnetic anomaly data are respectively normalized to a range of 0-1 by using the following formula; and $$Z_{i\ normalized}=(Z_i-Z_{min})+(Z_{max}-Z_{min})$$

in the formula, $Z_{i\ normalized}$ is the data obtained after the normalization of $Z_i$, $Z_i$ is the $i^{th}$ Z data; $Z_{max}$ is the maximum value of the Z data, and $Z_{min}$ is the minimum value of the Z data, where the Z data is the plane-gridded natural seismic data, the plane-gridded surface elevation data, the plane-gridded Bouguer gravity anomaly data or the plane-gridded aeromagnetic anomaly data.

Performing dimensionality reduction on the normalized and plane-gridded natural seismic data, the normalized and plane-gridded surface elevation data, the normalized and plane-gridded Bouguer gravity anomaly data, and the normalized and plane-gridded aeromagnetic anomaly data by using a principal component analysis method to obtain first principal component data Y1 and second principal component data Y2;

the obtained first principal component data=0.91×the normalized and plane-gridded natural seismic data−0.878×the normalized surface elevation+0.843×the normalized and plane-gridded Bouguer gravity anomaly data+0.835×the normalized and plane-gridded aeromagnetic anomaly data; and the obtained second principal component data=0.081× the normalized and plane-gridded natural seismic data+ 0.0395×the normalized surface elevation−0.011×the normalized and plane-gridded Bouguer gravity anomaly data+ 0.196×the normalized and plane-gridded aeromagnetic anomaly data.

Figure 4:
FIG. 4 shows a plane distribution map of different types of seismic zones in the target region as described in the embodiment 1 of the present disclosure.

Using a K-means algorithm to conduct unsupervised clustering on a cross plot of Y1 and Y2, determining Y1 threshold values and Y2 threshold values of a meizoseismal area, a moderate earthquake area and a weak earthquake area, and dividing a target region into four classes, i.e., the meizoseismal area, the moderate earthquake area, the weak earthquake area and the aseismic area so as to obtain a plane distribution map of different types of seismic zones in the target region; where the first principal component threshold value and the second principal component threshold value of the meizoseismal area are determined to be 1.52 and 0.91 respectively; the first principal component threshold value and the second principal component threshold value of the moderate earthquake area are respectively 0.47 and 0.43; the first principal component threshold value and the second principal component threshold value of the weak earthquake area are respectively −1.32 and −0.21; that is, when the first principal component is greater than or equal to 1.52 or the second principal component is greater than or equal to 0.91, it indicates in the meizoseismal area; when the first principal component is greater than or equal to 0.47 and less than 1.52 or the second principal component is greater than or equal to 0.43 and less than 0.91, it indicates in the moderate earthquake area; when the first principal component is greater than or equal to −1.32 and less than 0.47 or the second principal component is greater than or equal to −0.21 and less than 0.43, it indicates in the weak earthquake area; and FIG. 4 shows the plane distribution map of the different types of seismic zones in the target region.

Figure 5:
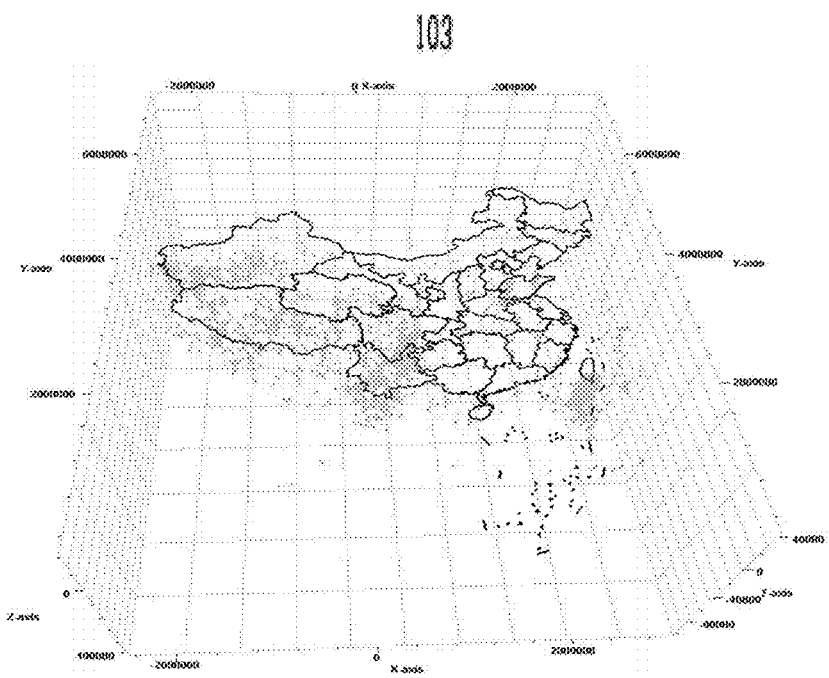
FIG. 5 shows a three-dimensional distribution map of a meizoseismal area in the target region as described in the embodiment 1 of the present disclosure.

4. Performing three-dimensional gridding processing:

constructing three-dimensional grids within the territory of China: establishing grids with an east-west length of 20 km, a north-south length of 20 km and a longitudinal depth 1 km; based on the existing records about natural earthquakes within the territory of China, determining intraplate earthquake magnitudes of all the grids within the territory of China to obtain the three-dimensional magnitude distribution of the intraplate earthquakes that had occurred within the territory of China, where in the process of determining the intraplate earthquake magnitudes of all the grids within the territory of China, for each grid within the territory of China, the seismic records in the same grid are superimposed in accordance with the energy, and the intraplate earthquake magnitude of the grid is determined based on the superimposed energy; when the energy obtained by means of superimposition in one grid is zero, the superimposed energy in the grid is defined as 1; the earthquake magnitude is determined by the following formula: lgE=4.8+1.5M, where E is the energy obtained by superimposition, J; and M is the Richter magnitude of an earthquake;

determining a cut-off value for the meizoseismal area with the three-dimensional gridded natural seismic data to be 4;

based on the three-dimensional gridded natural seismic data, acquiring a three-dimensional distribution map (which can reflect the three-dimensional distribution characteristics of the meizoseismal area) of the meizoseismal area within the territory of China by using the cut-off value for the meizoseismal area with the three-dimensional gridded natural seismic data; and it can be seen from FIG. 4 and FIG. 5 that intraplate earthquakes occur frequently in the western Sichuan Basin, and there is a meizoseismal area with continuous strong earthquakes.

Constructing three-dimensional grids within the territory of China: establishing grids with an east-west length of 20 km, a north-south length of 20 km and a longitudinal depth 1 km; based on the seismic wave tomography data in the target region, determining seismic wave tomography values of all the grids in the target region to obtain three-dimensional gridded seismic wave tomography data of the target region, where in the process of determining the seismic wave tomography values of all the grids in the target region, for each grid in the target region, the seismic wave tomography data in the same grid is averaged to obtain an average seismic wave tomography value of the grid as the seismic wave tomography value of the grid; and preferably, when there is no seismic wave tomography data in one grid, the seismic wave tomography values of six grids which are located above and below grid as well as at the left, right, front and rear of the grid and are adjacent to the grid are taken to calculate a geometric average value as the seismic wave tomography value of the grid.

Figure 6A:
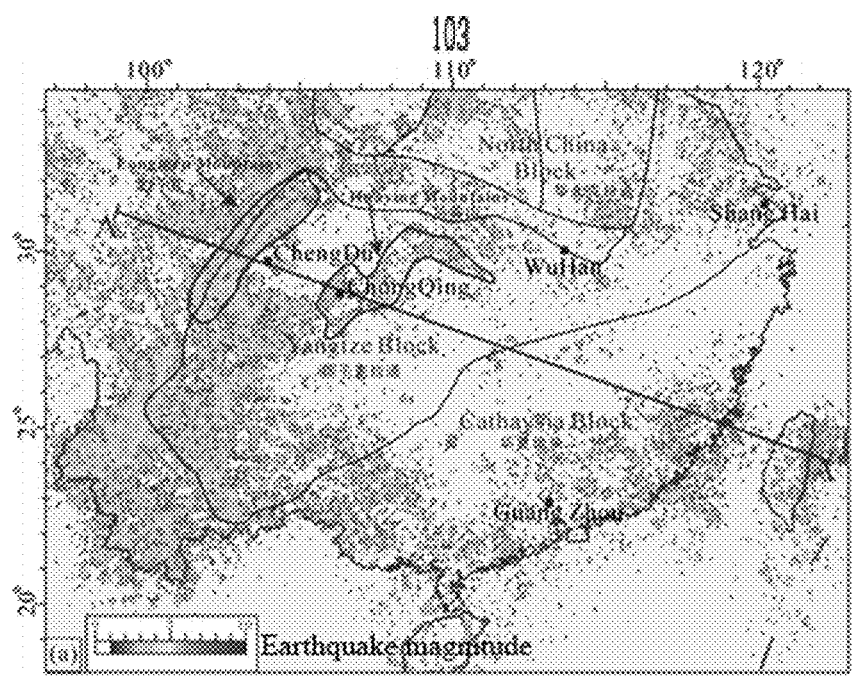
FIG. 6A shows a map of the location of a profile A-A' as described in the embodiment 1 of the present disclosure.
Figure 6B:
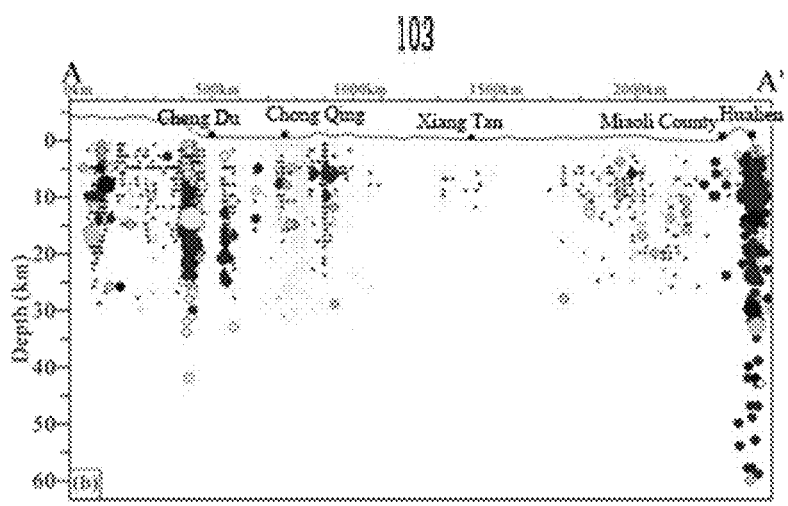
FIG. 6B shows a seismogram of the profile A-A' as described in the embodiment 1 of the present disclosure.
Figure 6C:
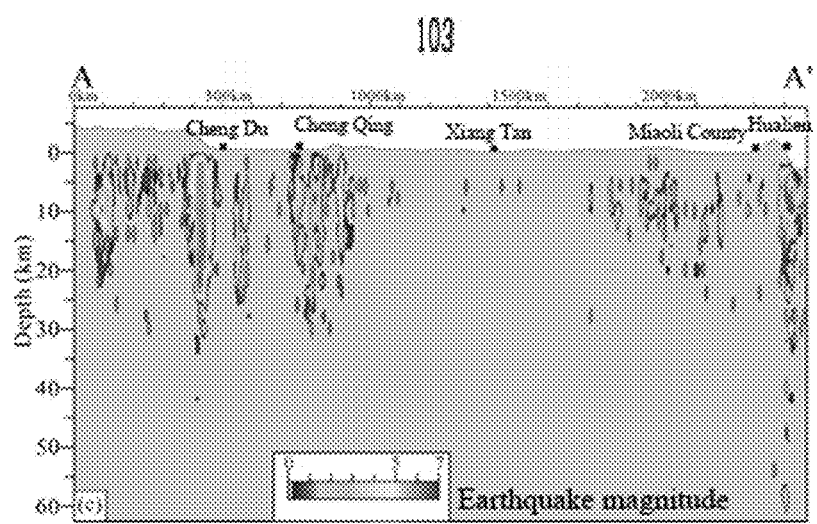
FIG. 6C shows a distribution diagram of the seismic magnitudes of the profile A-A' as described in the embodiment 1 of the present disclosure.

5. Performing profile gridding processing:

determining the position (as shown in FIG. 6A) of a profile A-A' of the meizoseismal area within the territory of China, taking an area within a range of 20 km away from both sides of the profile as a control range of the profile, and establishing grids with a length of 5 km and a longitudinal depth of 1 km on the profile; based on the records about intraplate natural earthquakes that had occurred within the territory of China, determining the records about the intraplate natural earthquakes that had occurred within the control range of the profile A-A', projecting the records about the natural earthquakes that had occurred within the control range of the profile A-A' onto the profile A-A' (as shown in FIG. 6B) by shaft plumbing, and then determining intraplate earthquake magnitudes of all the grids in the profile A-A' within the territory of China so as to obtain the profile distribution (with the result as shown in FIG. 6C) of the intraplate earthquake magnitudes in the profile A-A' within the territory of China, where in the process of determining the intraplate earthquake magnitudes of all the grids in the profile A-A' within the territory of China, for each grid in the profile A-A', the seismic records which are projected onto the same grid by shaft plumbing are superimposed in accordance with the energy, and the intraplate earthquake magnitude of the grid is determined based on the superimposed energy; and when the energy obtained by means of superimposition in one grid is zero, the superimposed energy in the grid is defined as 1; and the earthquake magnitude is determined by the following formula: lgE=4.8+1.5M, where E is the energy obtained by superimposition, J; and M is the Richter magnitude of an earthquake.

It can be seen from FIG. 6C that the Longmen mountain seismic belt, the Huaying mountain seismic belt and the Taiwan seismic belt have stronger seismic energy, and most anomalous earthquakes occur at depths below 30 kilometers.

Figure 7A:
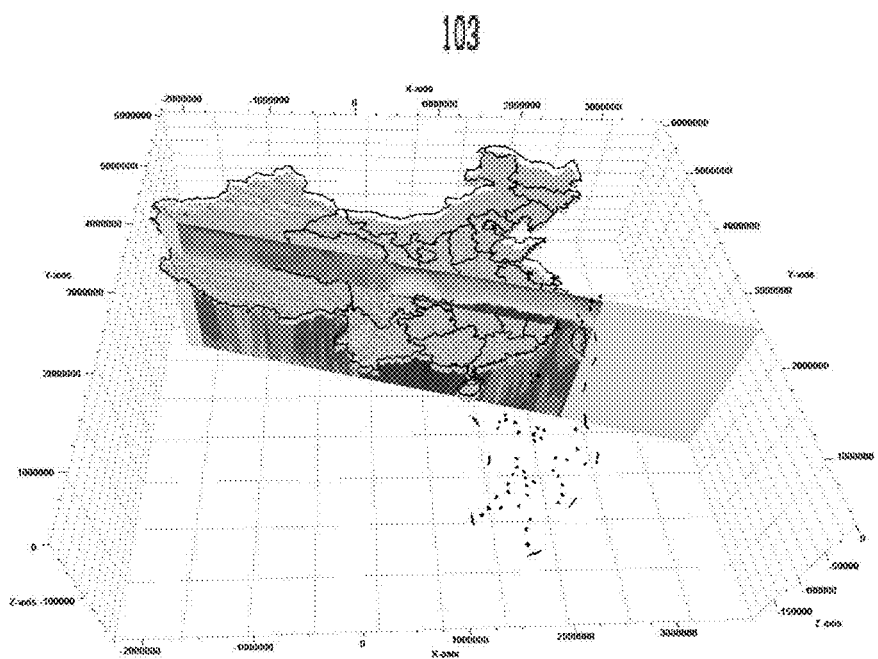
FIG. 7A shows a plane distribution and genesis analysis diagram of the meizoseismal area as described in the embodiment 1 of the present disclosure.

6. Analyzing geologic origin of intraplate earthquakes (1) Analyzing the Relationship Between Seismic Plane Distribution and Crustal Structure Superimposing a surface elevation map and the plane distribution map of the different types of seismic zones with the three-dimensional gridded seismic wave tomography, and analyzing the crustal movement on both sides of the meizoseismal area and the matching relationship between the meizoseismal area and the crustal geological structure in combination with the crustal GPS movement rate and the focal mechanism solution so as to determine the geologic origin of a pleistoseismic zone, where superimposing the surface elevation map and the plane distribution map of the meizoseismal area in the target region with the three-dimensional gridded seismic wave tomography is achieved in the following manner:

determining the distribution of the meizoseismal area in the target region based on the plane distribution map of the meizoseismal area in the target region; based on the distribution of the meizoseismal area in the target region, acquiring seismic wave tomography profile maps of the meizoseismal area in the target region and its two sides in combination with the three-dimensional gridded seismic wave tomography; projecting the plane distribution map of the meizoseismal area in the target region onto the surface elevation map to obtain a superimposed map of the surface elevation and the plane distribution of the meizoseismal area; superimposing the superimposed map of the surface elevation and the plane distribution of the meizoseismal area with the seismic wave tomography profile maps; and specifically, by selecting the surface elevation map and the meizoseismal area distribution map of the western Sichuan Basin to be superimposed with the tomography profile maps thereof (as shown in FIG. 7A), it can be found that this region is formed by the collision between the Yangtze Block and the Qinghai-Tibet Plateau.

Figure 7B:
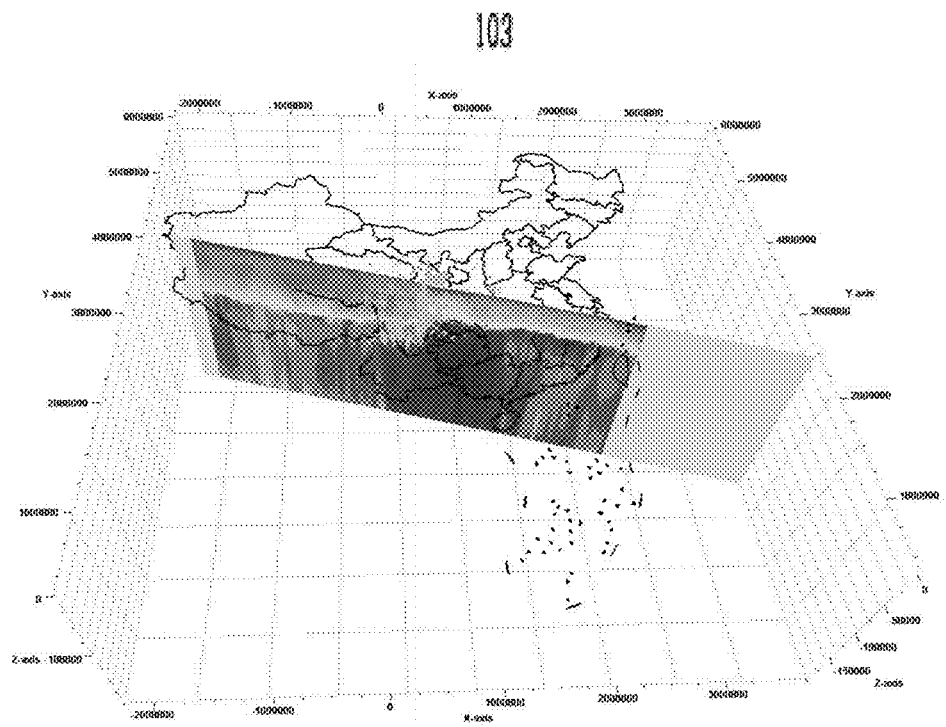
FIG. 7B shows a three-dimensional distribution and genesis analysis diagram of the meizoseismal area as described in the embodiment 1 of the present disclosure.

(2) Analyzing the Relationship Between Seismic Three-Dimensional Distribution and Crustal Structure Superimposing the three-dimensional distribution map of the meizoseismal area with the three-dimensional gridded seismic surface wave tomography, and analyzing the matching relationship between the meizoseismal area and the crustal geological structure, where superimposing the three-dimensional distribution map of the meizoseismal area with the three-dimensional gridded seismic surface wave tomography is achieved in the following manner:

determining the distribution of the meizoseismal area in the target region based on the three-dimensional distribution map of the meizoseismal area in the target region; based on the distribution of the meizoseismal area in the target region, acquiring seismic wave tomography profile maps of the meizoseismal area in the target region and its two sides in combination with the three-dimensional gridded seismic wave tomography; superimposing the three-dimensional distribution map of the meizoseismal area in the target region with the seismic wave tomography profile maps; and specifically, by selecting the meizoseismal area of the western Sichuan Basin to be superimposed with the tomography profile maps thereof (as shown in FIG. 7B), it can be found that this region is formed by the collision between the Yangtze Block and the Qinghai-Tibet Plateau.

Specific embodiments are only used to illustrate the principles and implementation of the present disclosure so as to help understand the method and core idea of the present disclosure; and moreover, it will be appreciated that those of ordinary skill in the art, upon attaining and understanding of the foregoing, may readily conceive of alterations to, variations of, and equivalents to theses embodiments in the aspects of specific implementation and application scope. To sum up, the content of this description should not be construed as a limitation to the present disclosure.

What is claimed is:

1. An earthquake evaluation method based on multi-type geophysical data, comprising:

acquiring natural seismic data about intraplate earthquakes that had occurred, surface elevation data, Bouguer gravity anomaly data, aeromagnetic anomaly data, seismic wave tomography, crustal GPS movement rate and focal mechanism solution in a target region, wherein the seismic wave tomography comprises seismic surface wave tomography and/or seismic body wave tomography;

constructing planar grids of the target region by making the target region to be subjected to plane gridding; respectively performing plane gridding processing on the natural seismic data about the intraplate earthquakes, the surface elevation data, the Bouguer gravity anomaly data and the aeromagnetic anomaly data in accordance with the planar grids of the target region to obtain plane-gridded natural seismic data, plane-gridded surface elevation data, plane-gridded Bouguer gravity anomaly data and plane-gridded aeromagnetic anomaly data;

determining a plane distribution map of a meizoseismal area in the target region based on the plane-gridded natural seismic data, the plane-gridded surface elevation data, the plane-gridded Bouguer gravity anomaly data, and the plane-gridded aeromagnetic anomaly data;

superimposing a surface elevation map and the plane distribution map of the meizoseismal area in the target region with the seismic wave tomography, and analyzing the crustal movement on both sides of the meizoseismal area and the matching relationship between the meizoseismal area and the crustal geological structure in combination with the crustal GPS movement rate and the focal mechanism solution so as to determine the geologic origin of a pleistoseismic zone; wherein in accordance with the planar grids of the target region, the plane gridding processing performed on the natural seismic data about the intraplate earthquakes comprises: based on the natural seismic data about the intraplate earthquakes that had occurred in the target region, determining intraplate earthquake magnitudes of all the grids in the target region to obtain the magnitude distribution of the intraplate earthquakes that had occurred in the target region, so as to obtain the plane-gridded natural seismic data in the target region, wherein in the process of determining the intraplate earthquake magnitudes of all the grids in the target region, for each grid in the target region, the intraplate natural earthquakes in the same grid are superimposed in accordance with the energy, and the intraplate earthquake magnitude of the grid is determined based on the superimposed energy;

in accordance with the planar grids of the target region, the plane gridding processing performed on the surface elevation data comprises: based on the surface elevation data in the target region, determining surface elevation values of all the grids in the target region to obtain the plane-gridded surface elevation data in the target region, wherein in the process of determining the surface elevation values of all the grids in the target region, for each grid in the target region, the surface elevation data in the same grid is averaged to obtain an average surface elevation value of the grid as the surface elevation value of the grid;

in accordance with the planar grids of the target region, the plane gridding processing performed on the Bouguer gravity anomaly data comprises: based on the surface elevation data in the target region, determining Bouguer gravity anomaly values of all the grids in the target region to obtain the plane-gridded Bouguer gravity anomaly data in the target region, wherein in the process of determining the Bouguer gravity anomaly values of all the grids in the target region, for each grid in the target region, the Bouguer gravity anomaly data in the same grid is averaged to obtain an average Bouguer gravity anomaly value of the grid as the Bouguer gravity anomaly value of the grid; and in accordance with the planar grids of the target region, the plane gridding processing performed on the aeromagnetic anomaly data comprises: based on the surface elevation data in the target region, determining aeromagnetic anomaly values of all the grids in the target region to obtain the plane-gridded aeromagnetic anomaly data in the target region, wherein in the process of determining the aeromagnetic anomaly values of all the grids in the target region, for each grid in the target region, the aeromagnetic anomaly data in the same grid is averaged to obtain an average aeromagnetic anomaly value of the grid as the aeromagnetic anomaly value of the grid.

2. The method according to claim 1, wherein the construction of the planar grids of the target region by making the target region to be subjected to plane gridding comprises: establishing the grids at 0.01°-0.1° in the east-west direction and at 0.01°-0.1° in the north-south direction.

3. The method according to claim 1, wherein in the process of performing plane gridding processing on the natural seismic data about the intraplate earthquakes, when the energy obtained by means of superimposition in one grid is zero, the superimposed energy in the grid is defined as 1.

4. The method according to claim 1, wherein in the process of performing plane gridding processing on the surface elevation data, when there is no surface elevation data in one grid, the surface elevation values of four grids which are located in the east, west, south and north of the grid and are adjacent to the grid are taken to calculate a geometric average value as the surface elevation value of the grid.

5. The method according to claim 1, wherein in the process of performing plane gridding processing on the Bouguer gravity anomaly data, when there is no Bouguer gravity anomaly data in one grid, the Bouguer gravity anomaly values of four grids which are located in the east, west, south and north of the grid and are adjacent to the grid are taken to calculate a geometric average value as the Bouguer gravity anomaly value of the grid.

6. The method according to claim 1, wherein in the process of performing plane gridding processing on the aeromagnetic anomaly data, when there is no aeromagnetic anomaly data in one grid, the aeromagnetic anomaly values of four grids which are located in the east, west, south and north of the grid and are adjacent to the grid are taken to calculate a geometric average value as the aeromagnetic anomaly value of the grid.

7. The method according to claim 1, wherein the determination, based on the plane-gridded natural seismic data, the plane-gridded surface elevation data, the plane-gridded Bouguer gravity anomaly data and the plane-gridded aeromagnetic anomaly data, of the plane distribution map of the meizoseismal area in the target region comprises:
normalizing the plane-gridded natural seismic data, the plane-gridded surface elevation data, the plane-gridded Bouguer gravity anomaly data and the plane-gridded aeromagnetic anomaly data respectively to obtain normalized and plane-gridded natural seismic data, normalized and plane-gridded surface elevation data, normalized and plane-gridded Bouguer gravity anomaly data, and normalized and plane-gridded aeromagnetic anomaly data;
performing dimensionality reduction on the normalized and plane-gridded natural seismic data, the normalized and plane-gridded surface elevation data, the normalized and plane-gridded Bouguer gravity anomaly data, and the normalized and plane-gridded aeromagnetic anomaly data by using a principal component analysis method to obtain first principal component data and second principal component data;
performing cluster analysis on all groups of principal component data, determining a first principal component threshold value and a second principal component threshold value of the meizoseismal area, and dividing the target region into the meizoseismal area and a non-meizoseismal area to obtain the plane distribution map of the meizoseismal area in the target region; wherein
the process of performing the cluster analysis on all the groups of principal component data further comprises: determining first principal component threshold values and second principal component threshold values of a moderate earthquake area and a weak earthquake area, and further dividing the non-meizoseismal area in the target region into the moderate earthquake area, the weak earthquake area and an aseismic area so as to obtain a plane distribution map of different types of seismic zones in the target region;
the first principal component data=0.91×the normalized and plane-gridded natural seismic data−0.878×the normalized surface elevation+0.843×the normalized and plane-gridded Bouguer gravity anomaly data+0.835× the normalized and plane-gridded aeromagnetic anomaly data; and
the second principal component data=0.081×the normalized and plane-gridded natural seismic data+0.0395× the normalized surface elevation−0.011×the normalized and plane-gridded Bouguer gravity anomaly data+ 0.196×the normalized and plane-gridded aeromagnetic anomaly data.

8. The method according to claim 1, wherein superimposing the surface elevation map and the plane distribution map of the meizoseismal area in the target region with the seismic wave tomography comprises:
determining the distribution of the meizoseismal area in the target region based on the plane distribution map of the meizoseismal area in the target region;
based on the distribution of the meizoseismal area in the target region, acquiring seismic wave tomography profile maps of the meizoseismal area in the target region and its two sides in combination with the seismic wave tomography;
projecting the plane distribution map of the meizoseismal area in the target region onto the surface elevation map to obtain a superimposed map of the surface elevation and the plane distribution of the meizoseismal area; and
superimposing the superimposed map of the surface elevation and the plane distribution of the meizoseismal area with the seismic wave tomography profile maps.

9. The method according to claim 1, further comprising: in accordance with the plane distribution map of the meizoseismal area in the target region, determining a profile passing through the meizoseismal area in the target region, and constructing profile grids; performing profile gridding processing on the natural seismic data about the intraplate earthquakes in accordance with the profile grids to obtain profile-gridded natural seismic data; wherein
the profile gridding processing performed on the natural seismic data about the intraplate earthquakes in accordance with the constructed profile grids comprises: taking an area within a range of 1-50 km away from both sides of the profile as a control range of the profile, and establishing grids with a length of 1-10 km and a longitudinal depth of 0.5-5 km on the profile;
moreover, in accordance with the profile grids, the profile gridding processing performed on the natural seismic data about the intraplate earthquakes comprises: based on records about natural earthquakes that had occurred in the target region, determining the records about the natural earthquakes that had occurred within the control range of the profile, projecting the records about the natural earthquakes that had occurred within the control range of the profile onto the profile by shaft plumbing, and then determining intraplate earthquake magnitudes of all the grids in the target region so as to obtain the profile-gridded natural seismic data of the meizoseismal area in the target region, wherein in the process of determining the intraplate earthquake magnitudes of all the grids in the target region, for each grid in the target region, the intraplate natural earthquakes in the same grid are superimposed in accordance with the energy, and the intraplate earthquake magnitude of the grid is determined based on the superimposed energy; and when the energy obtained by means of superimposition in one grid is zero, the superimposed energy in the grid is defined as 1.

10. The method according to claim 1, further comprising: making the target region to be subjected to three-dimensional gridding to construct three-dimensional grids of the target region; performing three-dimensional gridding processing on the natural seismic data about the intraplate earthquakes in accordance with the three-dimensional grids of the target region to obtain three-dimensional gridded natural seismic data;
determining a cut-off value for the meizoseismal area with the three-dimensional gridded natural seismic data;
based on the three-dimensional gridded natural seismic data, acquiring a three-dimensional distribution map of the meizoseismal area in the target region by using the cut-off value for the meizoseismal area with the three-dimensional gridded natural seismic data; wherein
the construction of the three-dimensional grids of the target region by making the target region to be subjected to three-dimensional gridding comprises: establishing the grids with an east-west length of 1-50 km, a north-south length of 1-50 km and a longitudinal depth of 0.1-10 km, wherein in accordance with the three-dimensional grids of the target region, the three-dimensional gridding processing performed on the natural seismic data about the intraplate earthquakes comprises: based on the natural seismic data about intraplate earthquakes that had occurred in the target region, determining intraplate earthquake magnitudes of all the grids in the target region to obtain the magnitude distribution of the intraplate earthquakes that had occurred in the target region, so as to obtain the three-dimensional gridded natural seismic data in the target region, wherein in the process of determining the intraplate earthquake magnitudes of all the grids in the target region, for each grid in the target region, the intraplate natural earthquakes in the same grid are superimposed in accordance with the energy, and the intraplate earthquake magnitude of the grid is determined based on the superimposed energy; when the energy obtained by means of superimposition in one grid is zero, the superimposed energy in the grid is defined as 1; and the cut-off value for the meizoseismal area with the three-dimensional gridded natural seismic data is 4.

11. The method according to claim 9, further comprising: making the target region to be subjected to three-dimensional gridding to construct three-dimensional grids of the target region; performing three-dimensional gridding processing on the natural seismic data about the intraplate earthquakes in accordance with the three-dimensional grids of the target region to obtain three-dimensional gridded natural seismic data;

determining a cut-off value for the meizoseismal area with the three-dimensional gridded natural seismic data;

based on the three-dimensional gridded natural seismic data, acquiring a three-dimensional distribution map of the meizoseismal area in the target region by using the cut-off value for the meizoseismal area with the three-dimensional gridded natural seismic data; wherein the construction of the three-dimensional grids of the target region by making the target region to be subjected to three-dimensional gridding comprises: establishing the grids with an east-west length of 1-50 km, a north-south length of 1-50 km and a longitudinal depth of 0.1-10 km, wherein in accordance with the three-dimensional grids of the target region, the three-dimensional gridding processing performed on the natural seismic data about the intraplate earthquakes comprises: based on the natural seismic data about intraplate earthquakes that had occurred in the target region, determining intraplate earthquake magnitudes of all the grids in the target region to obtain the magnitude distribution of the intraplate earthquakes that had occurred in the target region, so as to obtain the three-dimensional gridded natural seismic data in the target region, wherein in the process of determining the intraplate earthquake magnitudes of all the grids in the target region, for each grid in the target region, the intraplate natural earthquakes in the same grid are superimposed in accordance with the energy, and the intraplate earthquake magnitude of the grid is determined based on the superimposed energy; when the energy obtained by means of superimposition in one grid is zero, the superimposed energy in the grid is defined as 1; and the cut-off value for the meizoseismal area with the three-dimensional gridded natural seismic data is 4.

12. The method according to claim 10, further comprising:

superimposing the three-dimensional distribution map of the meizoseismal area in the target region with the seismic wave tomography, and analyzing the matching relationship between the meizoseismal area and the crustal geological structure; wherein superimposing the three-dimensional distribution map of the meizoseismal area in the target region with the seismic wave tomography comprises:

determining the distribution of the meizoseismal area in the target region based on the three-dimensional distribution map of the meizoseismal area in the target region;

based on the distribution of the meizoseismal area in the target region, acquiring seismic wave tomography profile maps of the meizoseismal area in the target region and its two sides in combination with the seismic wave tomography; and superimposing the three-dimensional distribution map of the meizoseismal area in the target region with the seismic wave tomography profile maps.

13. The method according to claim 11, further comprising:

superimposing the three-dimensional distribution map of the meizoseismal area in the target region with the seismic wave tomography, and analyzing the matching relationship between the meizoseismal area and the crustal geological structure; wherein superimposing the three-dimensional distribution map of the meizoseismal area in the target region with the seismic wave tomography comprises:

determining the distribution of the meizoseismal area in the target region based on the three-dimensional distribution map of the meizoseismal area in the target region;

based on the distribution of the meizoseismal area in the target region, acquiring seismic wave tomography profile maps of the meizoseismal area in the target region and its two sides in combination with the seismic wave tomography; and superimposing the three-dimensional distribution map of the meizoseismal area in the target region with the seismic wave tomography profile maps.

14. The method according to claim 8, wherein the acquisition, based on the distribution of the meizoseismal area in the target region, of the seismic wave tomography profile maps of the meizoseismal area in the target region and its two sides in combination with the seismic wave tomography comprises:

making the target region to be subjected to three-dimensional gridding to construct three-dimensional grids of the target region; performing three-dimensional gridding processing on the seismic wave tomography in accordance with the three-dimensional grids of the target region to obtain three-dimensional gridded seismic wave tomography;

based on the distribution of the meizoseismal area in the target region, acquiring seismic wave tomography profile maps of the meizoseismal area in the target region and its two sides in combination with the three-dimensional gridded seismic wave tomography; wherein the construction of the three-dimensional grids of the target region by making the target region to be subjected to three-dimensional gridding comprises: establishing the grids with an east-west length of 1-50 km, a north-south length of 1-50 km and a longitudinal depth of 0.1-10 km; wherein in accordance with the three-dimensional grids of the target region, the three-dimensional gridding processing performed on the seismic wave tomography comprises: based on the seismic wave tomography data in the target region, determining seismic wave tomography values of all the grids in the target region to obtain three-dimensional gridded seismic wave tomography data of the target region, wherein in the process of determining the seismic wave tomography values of all the grids in the target region, for each grid in the target region, the seismic wave tomography data in the same grid is averaged to obtain an average seismic wave tomography value of the grid as the seismic wave tomography value of the grid; and when there is no seismic wave tomography data in one grid, the seismic wave tomography values of six grids which are located above and below grid as well as at the left, right, front and rear of the grid and are adjacent to the grid are taken to calculate a geometric average value as the seismic wave tomography value of the grid.

15. The method according to claim 1, wherein the determination, based on the superimposed energy, of the intraplate earthquake magnitude of the grid is achieved by the following formula:

$$lgE=4.8+1.5M$$

wherein E is the energy obtained by superimposition, J; and M is the Richter magnitude of an earthquake.

16. The method according to claim 9, wherein the determination, based on the superimposed energy, of the intraplate earthquake magnitude of the grid is achieved by the following formula:

$$lgE=4.8+1.5M$$

wherein E is the energy obtained by superimposition, J; and M is the Richter magnitude of an earthquake.

17. The method according to claim 10, wherein the determination, based on the superimposed energy, of the intraplate earthquake magnitude of the grid is achieved by the following formula:

$$lgE=4.8+1.5M$$

wherein E is the energy obtained by superimposition, J; and M is the Richter magnitude of an earthquake.

* * * * *